(12) United States Patent
Li et al.

(10) Patent No.: US 12,066,750 B2
(45) Date of Patent: Aug. 20, 2024

(54) CAMERA MODULE AND ELECTRONIC DEVICE

(71) Applicant: BOE TECHNOLOGY GROUP CO., LTD., Beijing (CN)

(72) Inventors: Xue Li, Beijing (CN); Yan Ren, Beijing (CN); Zhimao Wang, Beijing (CN); Ning Jia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 240 days.

(21) Appl. No.: 17/764,589

(22) PCT Filed: Mar. 18, 2021

(86) PCT No.: PCT/CN2021/081590
§ 371 (c)(1),
(2) Date: Mar. 29, 2022

(87) PCT Pub. No.: WO2022/057225
PCT Pub. Date: Mar. 24, 2022

(65) Prior Publication Data
US 2022/0342285 A1     Oct. 27, 2022

(30) Foreign Application Priority Data
Sep. 21, 2020  (CN) .......................... 202022072387.5

(51) Int. Cl.
*G03B 17/56* (2021.01)
*H04N 23/51* (2023.01)
*H04R 1/02* (2006.01)

(52) U.S. Cl.
CPC .......... *G03B 17/561* (2013.01); *H04N 23/51* (2023.01); *H04R 1/028* (2013.01)

(58) Field of Classification Search
None
See application file for complete search history.

(56) References Cited

U.S. PATENT DOCUMENTS

| 7,539,410 | B2 | 5/2009 | Ishiyama |
| 9,948,854 | B2 * | 4/2018 | Hsieh .................... H04N 23/57 |

(Continued)

FOREIGN PATENT DOCUMENTS

| CN | 202551192 U | * 11/2012 |
| CN | 202551192 U | 11/2012 |

(Continued)

OTHER PUBLICATIONS

Written Opinion from PCT/CN2021/081590 dated Jun. 21, 2021.

*Primary Examiner* — Rodney E Fuller
(74) *Attorney, Agent, or Firm* — Calfee, Halter & Griswold LLP

(57) ABSTRACT

A camera module and an electronic device are disclosed. The camera module is configured to be connected with a display device, and the display device is provided with a main board. The camera module includes: a mounting base configured to be fixedly connected with the display device; and a functional portion configured to be detachably connected with the mounting base. The functional portion includes a casing, a camera and a first adapter plate which are mounted in the casing. The first adapter plate and the camera are connected. The first adapter plate is configured to be connected to the main board in the display device when the functional portion is mounted on the mounting base.

24 Claims, 12 Drawing Sheets

(56) References Cited

U.S. PATENT DOCUMENTS

2002/0027613 A1* 3/2002 Tajima ................ G06F 1/1605
348/E5.13
2006/0093346 A1 5/2006 Ishiyama

FOREIGN PATENT DOCUMENTS

| CN | 102902313 A | 1/2013 |
|----|-------------|---------|
| CN | 203120019 U | 8/2013 |
| CN | 204425501 U | 6/2015 |
| CN | 105812638 A | 7/2016 |
| CN | 106973130 A | 7/2017 |
| CN | 110086708 A | 8/2019 |
| CN | 105812638 B | 9/2019 |
| CN | 209590500 U | 11/2019 |
| CN | 210463742 U | 5/2020 |
| CN | 210578865 U | 5/2020 |
| CN | 210605314 U | 5/2020 |
| CN | 210899362 U | 6/2020 |
| CN | 212628117 U | 2/2021 |

* cited by examiner

CAMERA MODULE AND ELECTRONIC DEVICE

CROSS REFERENCE OF RELATED APPLICATION(S)

This application is a 371 application of PCT Application No. PCT/CN2021/081590, filed Mar. 18, 2021, which claims priority to a Chinese patent application No. 202022072387.5, filed on Sep. 21, 2020, entitled "Camera Module and Whiteboard Device", the entire contents of which are incorporated herein by reference in their entirety.

TECHNICAL FIELD

Embodiments of the present disclosure generally relate to the display product manufacture technical field, and more particularly, to a camera module and an electronic device.

BACKGROUND

Display devices such as electronic whiteboards and intelligent interactive panels can communicate with computers. By connecting the display devices to a computer, and using a projector to project contents in the computer onto the screen of the display devices, a large-screen and interactive collaborative meeting or teaching environment can be constructed with the support of special application programs. However, at present, nano-capacitive thin-film display devices on the market cannot directly realize video communication, and need to be wiredly connected with a computer through a common camera.

SUMMARY

An objective of the present disclosure is to provide a camera module and an electronic device, thereby at least to a certain extent overcoming one or more problems caused by limitations and defects of the related art.

In a first aspect of the present disclosure, there is provided a camera module, configured to be connected with a display device, the display device being provided with a main board, and the camera module including:
- a mounting base configured to be fixedly connected with the display device; and
- a functional portion configured to be detachably connected with the mounting base, wherein the functional portion includes a casing, a camera and a first adapter plate which are mounted in the casing, the first adapter plate and the camera are connected, and the first adapter plate is configured to be connected to the main board in the display device when the functional portion is mounted on the mounting base.

In an exemplary embodiment of the present disclosure, the mounting base includes a chassis configured to be fixedly connected with the display device and a second adapter plate connected with the chassis, and the second adapter plate is configured to be connected with the main board in the display device;

the first adapter plate is provided with a first adapter port, the second adapter plate is provided with a second adapter port, and the first adapter port is configured to be plugged with the second adapter port when the functional portion is mounted on the mounting base, so as to perform signal transmission between the camera and the main board in the display device.

In an exemplary embodiment of the present disclosure, the casing includes:
- a middle frame having an accommodating cavity for accommodating the camera and the first adapter plate, wherein a front end of the accommodating cavity is open, and a bottom side of the middle frame close to the mounting base is provided with a first through hole corresponding to the first adapter port, and the first through hole communicates with the accommodating cavity; and
- a front frame arranged at the front end of the accommodating cavity, wherein the front frame is provided with a camera hole corresponding to the camera.

In an exemplary embodiment of the present disclosure, the casing further includes a cover plate mounted on an outer side of the front frame, and the cover plate is provided with a through hole; and
- an orthographic projection of the camera on the cover plate is located in the through hole.

In an exemplary embodiment of the present disclosure, when the chassis is fixedly connected with the display device, the chassis is configured to form a mounting cavity with a rear shell of the display device for accommodating the second adapter plate, and the chassis is provided with a second through hole corresponding to the second transition port;
- one of the first adapter port and the second adapter port is a male connector head, and the other one of the first adapter port and the second adapter port is a female connector head, and the male connector head passes through the first through hole and the second through hole to be plugged with the female connector head.

In an exemplary embodiment of the present disclosure, a partial area of a bottom side of the middle frame is formed as a concave portion, the concave portion is located on a side of the first through hole close to the front frame, and the concave portion is configured to be engaged with a frame of the display device when the functional portion is mounted on the mounting base.

In an exemplary embodiment of the present disclosure, a reinforcing plate opposite to the concave portion is provided in the accommodating cavity of the middle frame;
- an edge of the reinforcing plate is fixedly connected with a cavity wall of the accommodating cavity to divide the accommodating cavity into a first space close to the front frame and a second space away from the front frame, the first space is used for accommodating the camera, and the second space is used for accommodating the first adapter plate; and
- the reinforcing plate is provided with a wire through hole, and the wire through hole is used for a signal wire connected between the camera and the first adapter plate to pass through.

In an exemplary embodiment of the present disclosure, the functional portion further includes a U-shaped fixing plate located in the accommodating cavity of the middle frame, the U-shaped fixing plate includes a fixing bottom plate and two fixing side plates on opposite sides of the fixing bottom plate;
- both of the fixing side plates are fixedly connected with the front frame, so that the U-shaped fixing plate is connected with the front frame and forms an accommodating space with an inner side of the front frame for accommodating the camera; and
- the camera is fixed on the fixing bottom plate.

In an exemplary embodiment of the present disclosure, the U-shaped fixing plate is a heat-dissipating aluminum plate.

In an exemplary embodiment of the present disclosure, the camera hole of the front frame includes a first hole section and a second hole section located on a side of the first hole section close to the fixing bottom plate, and the first hole section is coaxial with the second hole section;

along a direction from the first hole section to the second hole section, an aperture of the first hole section gradually decreases, and an aperture of the second hole section remains unchanged and is the same as a minimum aperture of the first hole section.

In an exemplary embodiment of the present disclosure, the functional portion further includes a voice module located in the accommodating cavity and electrically connected to the first adapter plate.

In an exemplary embodiment of the present disclosure, the voice module includes a circuit board and a voice component mounted on the circuit board, the voice component includes at least a microphone, the voice component is mounted on an inner side of the front frame via the circuit board, and the circuit board is provided with a voice hole.

In an exemplary embodiment of the present disclosure, the voice module further includes foam, and the foam surrounds the voice hole correspondingly;

a mounting groove for accommodating the circuit board is formed on an inner side of the front frame, and a groove for accommodating the foam is formed on a bottom surface of the mounting groove opposite to a groove opening of the mounting groove.

In an exemplary embodiment of the present disclosure, a depth of the groove in a thickness direction of the front frame is smaller than a thickness of the foam.

In an exemplary embodiment of the present disclosure, the depth of the groove in the thickness direction of the front frame is 0.5 mm to 0.8 mm, and the thickness of the foam is 0.7 mm to 1 mm.

In an exemplary embodiment of the present disclosure, the front frame is provided with a first sound transmission hole corresponding to the voice hole, and the cover plate is provided with a second sound transmission hole corresponding to the first sound transmission hole;

the voice module is configured to collect external sound through the second sound transmission hole, the first sound transmission hole and the voice hole.

In an exemplary embodiment of the present disclosure, a slide rail is provided on an outer side of the front frame, and a slide cover is provided on the slide rail to slidably match the slide rail, an adjustment protrusion is provided on a side of the slide cover away from the front frame, the adjustment protrusion is located in the through hole of the cover plate, the adjustment protrusion is configured to drive the slide cover to move along an extending direction of the slide rail so as to block the camera hole in a first state or open the camera hole in a second state.

In an exemplary embodiment of the present disclosure, a color of the adjustment protrusion is different from that of other parts on the slide cover.

In an exemplary embodiment of the present disclosure, a first limit protrusion and a second limit protrusion are arranged at intervals in the extending direction of the slide rail in at least one of two opposite inner side walls of the slide rail in a first direction, the first direction is perpendicular to the extending direction of the slide rail and an axial direction of the camera hole;

the slide cover is provided with a groove, and the groove is configured to be fit with the first limit protrusion, so that the slide cover is limited and kept in the first state; the groove is configured to be fit with the second limit protrusion, so that the slide cover is limited and kept in the second state.

In an exemplary embodiment of the present disclosure, the slide cover has a main body portion and a cantilever portion, a cut is formed between the main body portion and the cantilever portion, a fixed end surface of the cantilever portion is connected to the main body portion, a first protrusion and a second protrusion arranged at a side of the first protrusion away from the fixed end of the cantilever portion are formed on a side of the cantilever portion away from the main body portion, and the first protrusion and the second protrusion are arranged at an interval to form the groove of the slide cover.

In an exemplary embodiment of the present disclosure, a surface of the first protrusion away from the main body portion is a first convex surface, and a surface of the second protrusion away from the main body portion is a second convex surface, and the first convex surface is closer to the main body portion than the second convex surface.

In an exemplary embodiment of the present disclosure, a height difference between the first convex surface and the second convex surface is 0.1 mm to 0.2 mm.

In an exemplary embodiment of the present disclosure, a distance between a free end surface of the cantilever portion and the main body portion is greater than an amount of engagement between the groove of the slide cover and the first limit protrusion and the groove of the slide cover and the second limit protrusion.

In an exemplary embodiment of the present disclosure, the first limit protrusion and the second limit protrusion are arranged at intervals in the extending direction of the slide rail in both of the two opposite inner side walls of the slide rail in the first direction;

grooves are provided on two opposite sides of the slide cover in the first direction.

In an exemplary embodiment of the present disclosure, a rear end of the accommodating cavity of the middle frame is open, the casing further includes a rear cover, and the rear cover covers the rear end of the accommodating cavity.

In an exemplary embodiment of the present disclosure, the front frame has a camera mounting area and a voice mounting area arranged at a side of the camera mounting area close to the mounting base, the camera mounting area is provided with the camera hole, and a side of the camera mounting area away from the voice mounting area is inclined toward a direction away from the rear cover.

In an exemplary embodiment of the present disclosure, an inclination angle of the camera mounting area is 10 degrees to 50 degrees.

In an exemplary embodiment of the present disclosure, the inclination angle of the camera mounting area is 20 degrees to 30 degrees.

In an exemplary embodiment of the present disclosure, a transparent protective layer is further provided between the slide cover and the front frame, and the transparent protective layer covers the camera hole.

In an exemplary embodiment of the present disclosure, the first adapter plate is further provided with a camera port, a microphone port and an echo cancellation port, the camera is connected to the camera port through a signal line, and the microphone port and the echo cancellation port are connected with the voice module through signal lines, respectively; and the camera port and the echo cancellation port are respectively located on opposite sides of the first adapter port in the second direction, and the microphone port and the camera port are located on a same side of the first adapter port in the second direction, the microphone port is located on a side of the camera port away from the first adapter port in a third direction, and the third direction and the second direction are perpendicular to each other.

In an exemplary embodiment of the present disclosure, the second adapter plate is further provided with a third adapter port thereon, and the third adapter port and the second adapter port are oppositely arranged in the second direction.

In an exemplary embodiment of the present disclosure, the third adapter port is configured to be connected to the main board in the display device through a flexible circuit board in the display device.

In a second aspect of the present disclosure, there is provided an electronic device, including a display device and the camera module according to any one of the above embodiments, wherein a mounting base of the camera module is fixed on the display device.

The beneficial effects of the present disclosure are as follows. The camera module is integratedly arranged on the display device, and functions such as video conference can be realized without an external camera, and the camera module directly integrated on the display device has a high matching degree with the display device.

Other features and advantages of the present disclosure will become apparent from the following detailed description, or can be learned in part by practice of the present disclosure.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the description, illustrate embodiments consistent with the disclosure and serve to explain principles of the disclosure together with the description. Obviously, the drawings in the following description are only some embodiments of the present disclosure, and for those of ordinary skill in the art, other drawings can be obtained from these drawings without creative effort.

DETAILED DESCRIPTION

Figure 1:
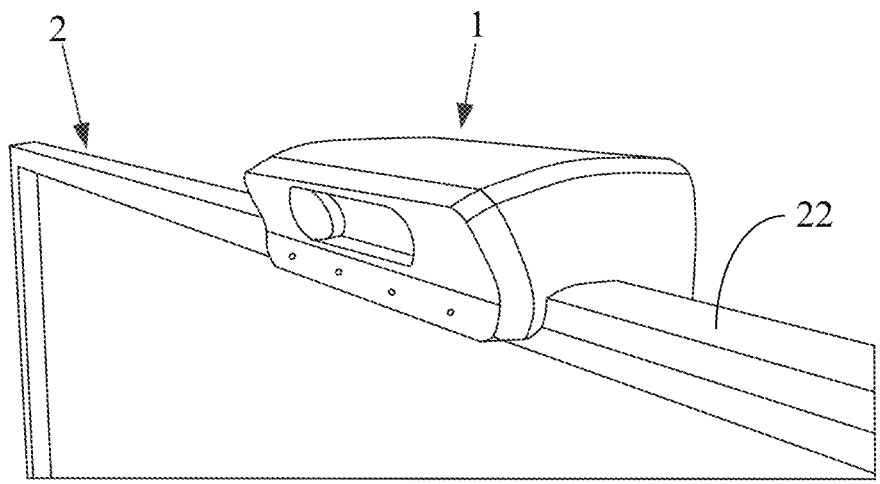
FIG. 1 shows a schematic structural diagram of a camera module and a display device after being assembled from a viewing angle according to an embodiment of the present disclosure.

The technical solutions of the present disclosure will be further specifically described below through embodiments with reference to the accompanying drawings. In the description, the same or similar reference numerals refer to the same or similar parts. The following description of the embodiments of the present disclosure with reference to the accompanying drawings is intended to explain the general inventive concepts of the present disclosure, and should not be construed as a limitation of the present disclosure.

Furthermore, in the following detailed description, for convenience of explanation, numerous specific details are set forth in order to provide a thorough understanding of the embodiments of the present disclosure. Obviously, however, one or more embodiments may be practiced without these specific details.

Unless otherwise defined, technical or scientific terms used in the disclosure have the ordinary meaning as understood by one of ordinary skill in the art to which this disclosure belongs. As used herein, "first", "second" and similar terms do not denote any order, quantity, or importance, but are merely used to distinguish various components.

Use of words like "comprising" or "having" in the present disclosure means that elements or things appearing before the words encompass elements or things listed after the words and their equivalents, but do not exclude other elements or things.

In the related art, a display device itself does not have a matching camera. In order to conduct video conferences through the display device, it is needed to connect a general-purpose camera. The camera is connected to a computer host through an external wire to realize the videoconferencing function. Such technical solution cannot be completely matched with the display device, and is inconvenient.

Figure 2:
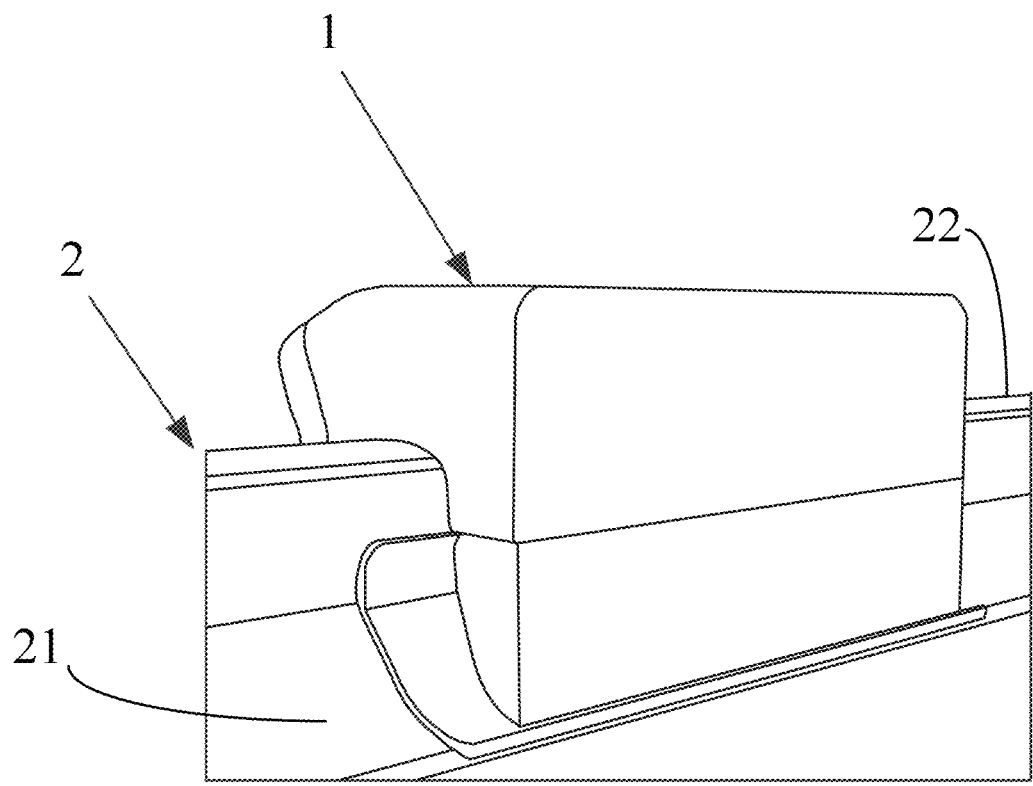
FIG. 2 shows a schematic structural diagram of a camera module and a display device after being assembled from another viewing angle according to an embodiment of the present disclosure.
Figure 24:
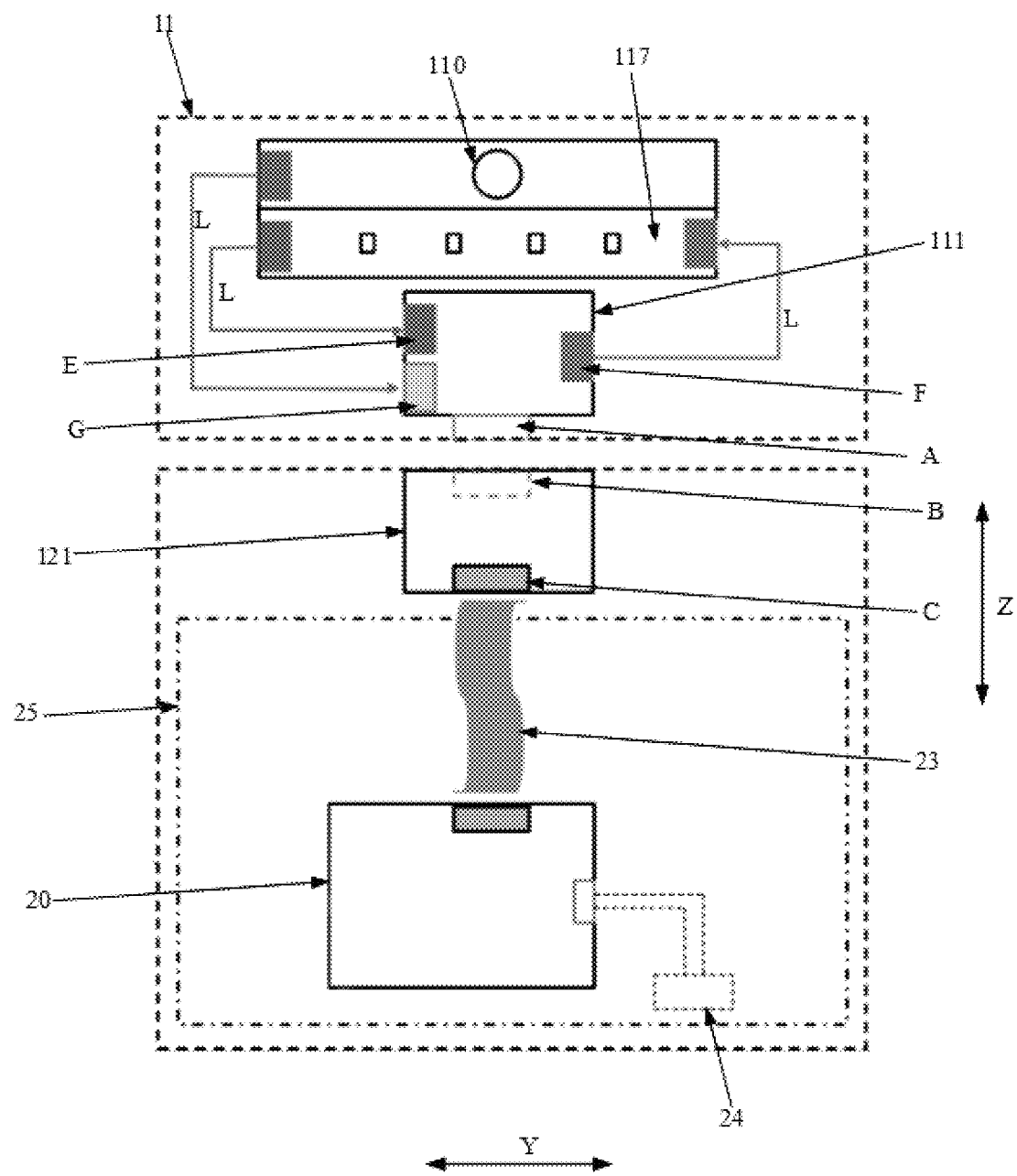
FIG. 24 shows a structural block diagram of the camera module and the display device according to an embodiment of the present disclosure.

In order to solve the problem, as shown in FIG. 1 and FIG. 2, an embodiment of the present disclosure provides a camera module 1, which is configured to be mounted on a display device 2, so that the display device 2 itself has a matching camera, which is convenient for use, and the matching degree between the camera and the display device 2 is high. It should be understood that the display device 2 is provided with a main board 20 (as shown in FIG. 24).

As shown in FIGS. 1 to 23, the camera module 1 according to embodiments of the present disclosure may include a functional portion 11 and a mounting base 12.

As shown in FIGS. 1 to 3 and FIGS. 5 and 8, the mounting base 12 is configured to be fixedly connected with the display device 2. For example, the mounting base 12 may be fixed to a rear shell 21 of the display device 2 by fasteners such as screws or bolts, in order to avoid a situation that the overall appearance of the display device 2 is affected by the setting of the mounting base 12. In addition, by installing the mounting base 12 at the rear shell 21 of the display device 2, the space at the rear shell 21 of the display device 2 can be reasonably used to appropriately reduce the space occupied by the whole product.

As shown in FIGS. 2 to 8, the functional portion 11 is configured to be detachably connected with the mounting base 12. The functional portion 11 includes a casing, a camera 110 and a first adapter plate 111 which are installed in the casing. The first adapter plate 111 may be connected with the camera 110, and the first adapter plate 111 is configured to be connected with the main board 20 in the display device 2 when the functional portion 11 is mounted on the mounting base 12, so as to conduct signal transmission between the camera 110 and the main board 20 in the display device.

By adopting the above technical solution, the camera module 1 which matches the corresponding display device 2 is integrated on the display device 2, and functions such as video conference can be realized without an external camera. Further, the camera module 1 directly integrated onto the display device 2 has a high matching degree with the display device 2.

In embodiments of the present disclosure, since the functional portion 11 and the mounting base 12 of the camera module 1 are detachably connected, when the camera needs to be used, the functional portion 11 can be connected to the mounting base 12, and when the camera does not need to be used, the functional portion 11 can be taken off from the mounting base 12, and this is convenient to use and operate.

In addition, by providing the mounting base 12 in embodiments of the present disclosure, the assembly stability of the functional portion 11 and the display device 2 can be improved, and it is convenient to assemble the functional portion 11 with the display device 2 of different appearances.

Figure 8:
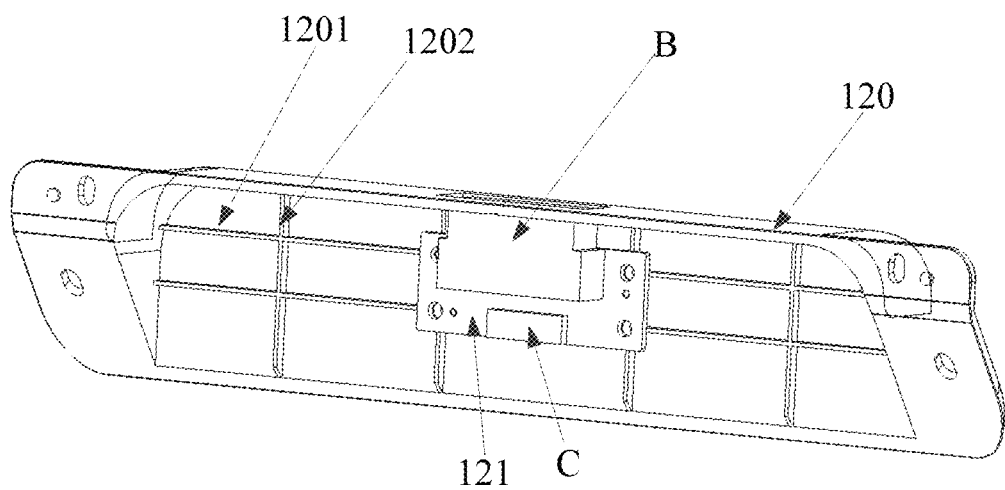
FIG. 8 shows a schematic structural diagram of the mounting base of the camera module from another viewing angle according to the embodiment of the present disclosure.

In an embodiment of the present disclosure, as shown in FIG. 8, the mounting base 12 includes a chassis 120 configured to be fixedly connected with the display device 2 and a second adapter plate 121 connected with the chassis 120. The second adapter plate 121 is configured to be connected with the main board 20 in the display device 2.

The aforementioned first adapter plate 111 may be provided with a first adapter port A, the second adapter plate 121 may be provided with a second adapter port B, and the first adapter port A is configured to be plugged with the second adapter port B when the functional portion 11 is mounted on the mounting base 12, so as to perform signal transmission between the camera 110 and the main board 20 in the display device 2.

In addition, as shown in FIG. 8, a third reinforcing rib 1201 and a fourth reinforcing rib 1202 may be disposed on the chassis 120 in embodiments of the present disclosure, so as to increase the structural strength of the chassis 120.

Figure 3:
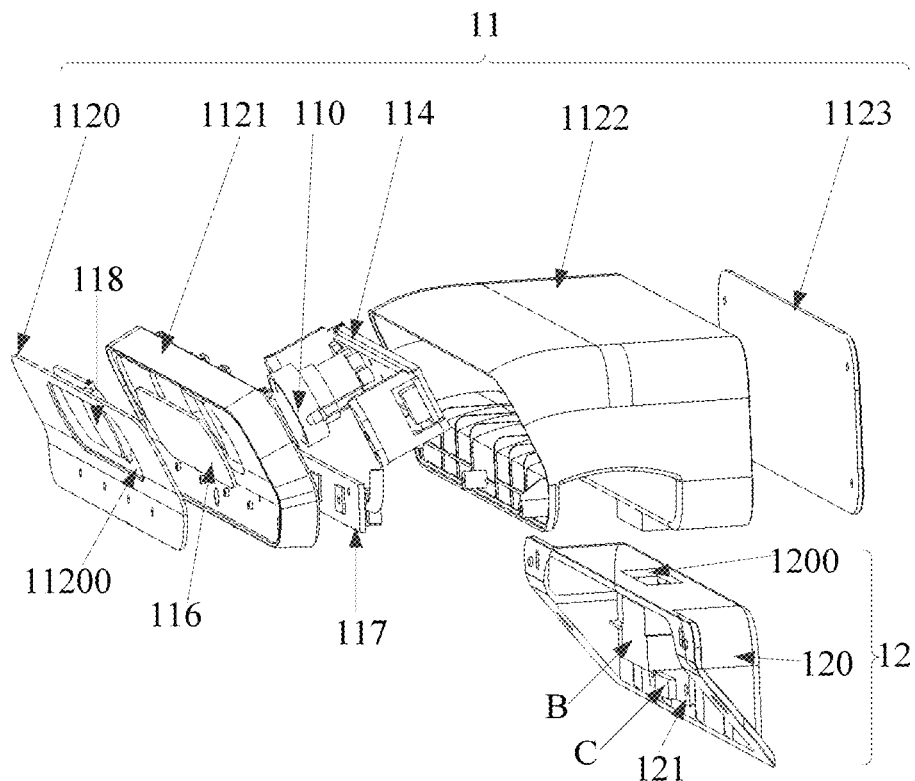
FIG. 3 shows a schematic diagram of an exploded structure of a camera module according to an embodiment of the present disclosure.

In embodiments of the present disclosure, as shown in FIG. 3, the casing of the functional portion 11 may include a cover plate 1120, a front frame 1121, a middle frame 1122 and a rear cover 1123 which are connected in sequence.

Figure 6:
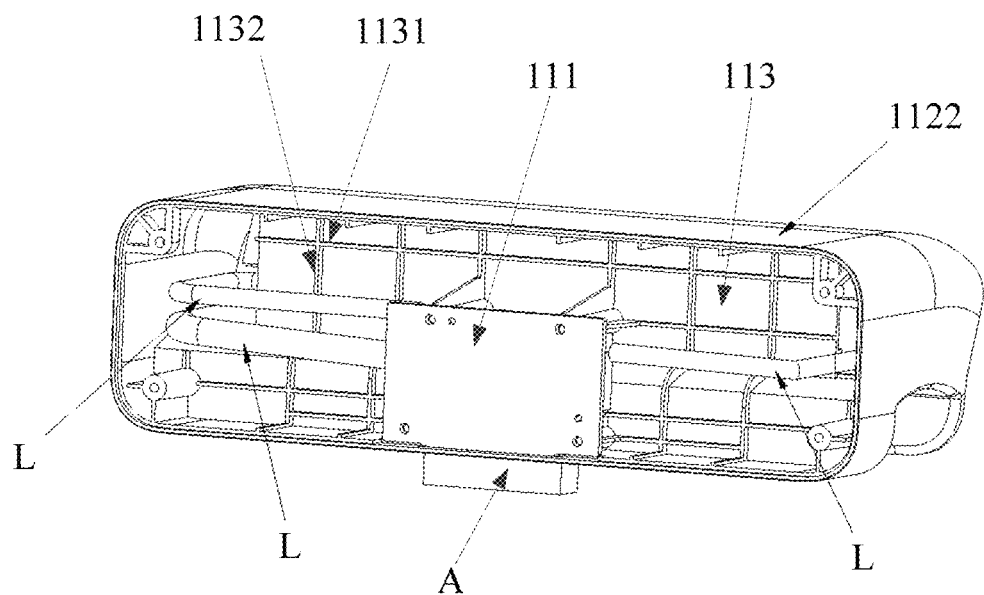
FIG. 6 shows a partial structural schematic diagram of the functional portion of the camera module according to an embodiment of the present disclosure.
Figure 7:
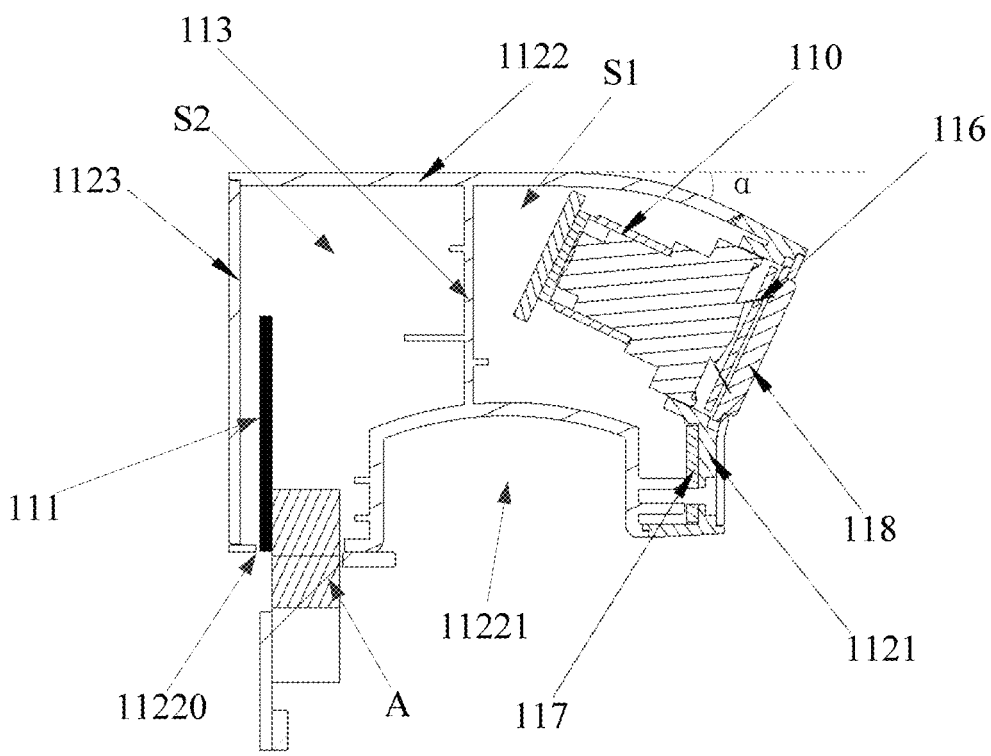
FIG. 7 shows a schematic cross-sectional view of the functional portion of the camera module according to an embodiment of the present disclosure.

In more detail, as shown in FIG. 6 and FIG. 7, the middle frame 1122 has an accommodating cavity for accommodating the camera 110 and the first adapter plate 111. The front and rear ends of the accommodating cavity are open. A bottom side of the middle frame 1122 close to the mounting base 12 is provided with a first through hole 11220 corresponding to the first adapter port A, and the first through hole 11220 communicates with the accommodating cavity.

Figure 10:
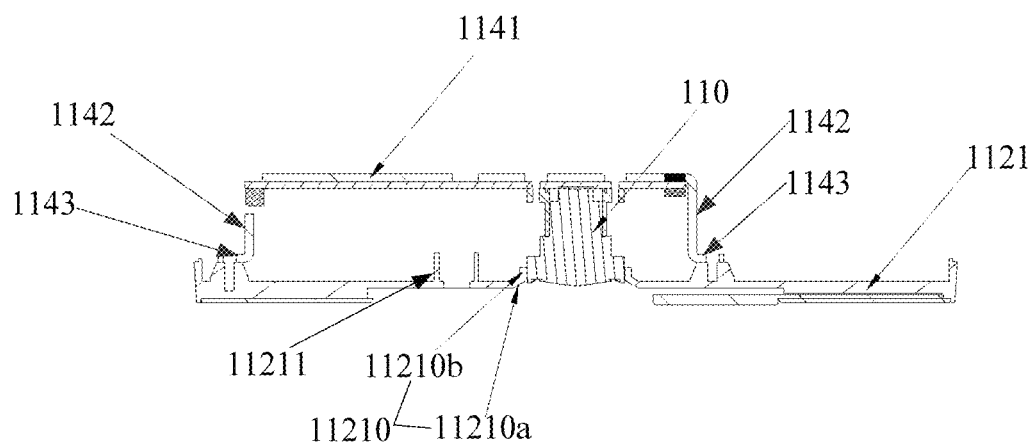
FIG. 10 shows a schematic cross-sectional view of the U-shaped fixing plate, the camera and a front frame in the camera module after being assembled according to an embodiment of the present disclosure.

As shown in FIG. 3, FIG. 6 and FIG. 7, the front frame 1121 may be disposed at the front end of the accommodating cavity. The front frame 1121 is provided with a camera hole 11210 corresponding to the camera 110, as shown in FIG. 10, that is, the orthographic projection of the camera 110 on the front frame 1121 at least partially overlaps with the camera hole 11210, so as to facilitate shooting of the outside. The cover plate 1120 can be installed on the outer side of the front frame 1121 (i.e., the side away from the rear cover 1123). For example, the cover plate 1120 can be fitted on the outer side of the front frame 1121 to appropriately reduce the space occupied by the functional portion 11 and ensure the look and feel of the functional portion 11.

As shown in FIG. 3, the cover plate 1120 is provided with a through hole 11200. The orthographic projection of the camera hole 11210 on the cover plate 1120 may be located in the through hole 11200, that is, the camera 110 can perform shooting of the outside through the camera hole 11210 and the through hole 11200. The rear cover 1123 may cover the rear end of the accommodating cavity of the middle frame 1122.

It should be noted that the cover plate 1120, the front frame 1121, the middle frame 1122 and the rear cover 1123 may be connected by fasteners such as screws or bolts, to facilitate the maintenance of the functional portion 11.

Figure 5:
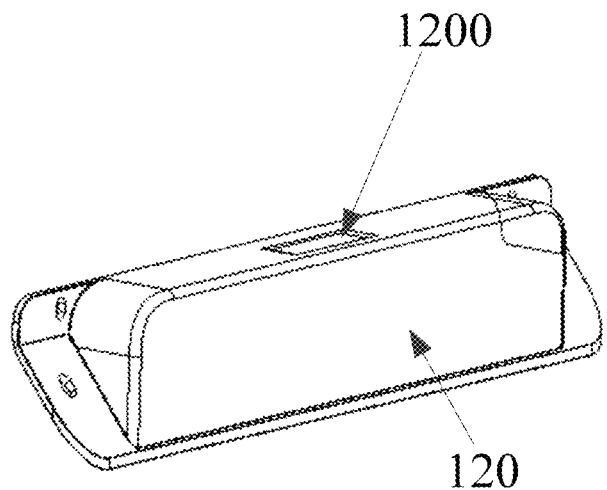
FIG. 5 shows a schematic structural diagram of a mounting base of a camera module from a viewing angle according to an embodiment of the present disclosure.

In embodiments of the present disclosure, when the chassis 120 is connected to the display device 2, the chassis 120 is configured to form a mounting cavity for accommodating the second adapter plate 121 with the rear shell 21 of the display device 2, and the chassis 120 is provided with a second through hole 1200 corresponding to the second adapter port B, as shown in FIG. 3, FIG. 5 and FIG. 7.

One of the aforementioned first adapter port A and second adapter port B is a male connector head, and the other is a female connector head. The male connector head is plugged with the female connector head through the first through hole 11220 and the second through hole 1200.

For example, in some embodiments of the present disclosure, the first adapter port A the may be a male OPS (open pluggable specification) connector head, and the second adapter port B may be a female OPS connector head, and embodiments of the present disclosure do not impose specific limitations on this.

Figure 4:
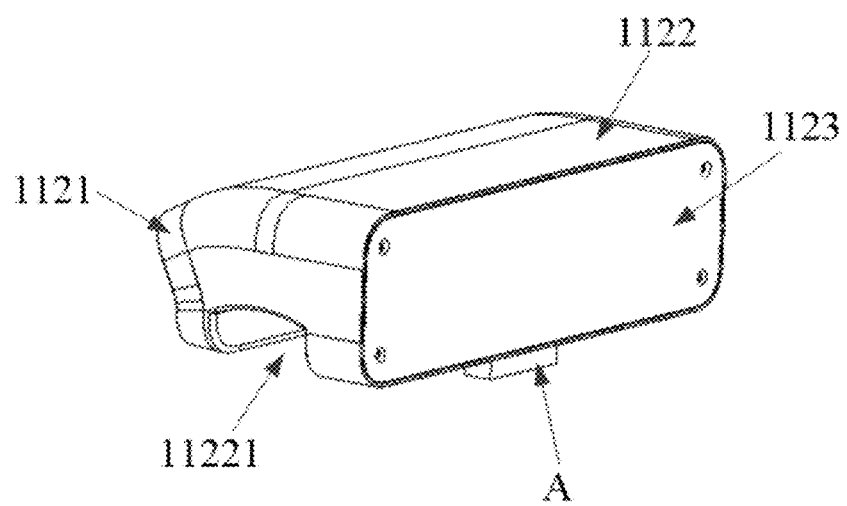
FIG. 4 shows a schematic structural diagram of a functional portion of a camera module according to an embodiment of the present disclosure.

In embodiments of the present disclosure, as shown in FIG. 4 and FIG. 7, a partial area on the bottom side of the middle frame 1122 is formed as a concave portion 11221. It should be noted that the bottom side of the middle frame 1122 refers to: a side of the middle frame 1122 close to the mounting base 12 in a state of usage (i.e., in a state in which the functional portion 11 is mounted on the mounting chassis 12). The concave portion 11221 is located on a side of the first through hole 11220 close to the front frame 1121. The concave portion 11221 is configured to be engaged with a frame 22 of the display device 2 when the functional portion 11 is mounted on the mounting base 12, as shown in FIG. 2, so as to ensure that the functional portion 11 is stably assembled on the display device 2 and improve product stability.

In embodiments of the present disclosure, as shown in FIG. 6 and FIG. 7, a reinforcing plate 113 is provided in the accommodating cavity of the middle frame 1122. The edge of the reinforcing plate 113 is fixedly connected with a cavity wall of the accommodating cavity to divide the accommodating cavity into a first space S1 close to the front frame 1121 and a second space S2 away from the front frame 1121. The first space S1 is used to accommodate the camera 110, and the second space S2 is used to accommodate the first adapter plate 111. The reinforcing plate 113 may be provided with a wire through hole for a signal line L connected between the camera 110 and the first adapter plate 111 to pass through. It should be noted that the wire through hole may be formed on an edge of the reinforcing plate 113, but embodiments of the present disclosure are not limited to this and the wire through hole can also be formed in the central area of the reinforcing plate 113, etc., depending on the specific situation, as long as the regularity of the wiring in the middle frame 1122 can be ensured.

In embodiments of the present disclosure, by disposing the reinforcing plate 113 in the accommodating cavity of the middle frame 112, the structural strength of the middle frame 1122 can be improved and its service life can be prolonged.

For example, in order to further improve the strength of the middle frame 1122, a reinforcing rib may be added to the reinforcing plate 113. As shown in FIG. 6, the reinforcing plate 113 is provided with a first reinforcing rib 1131 and a second reinforcing rib 1132 crosswise.

In embodiments of the present disclosure, the first reinforcing rib 1131 and the second reinforcing rib 1132 may be arranged perpendicular to each other, and the extending direction of the first reinforcing rib 1131 is parallel to the length direction of the reinforcing plate 113, and the extending direction of the second reinforcing rib 1132 is parallel to the width direction of the reinforcing plate 113, but embodiments of the present disclosure are not limited to this.

Further, as shown in FIG. 7, the reinforcing plate 113 may be opposite to the concave portion 11221. When the functional portion 11 is mounted on the mounting base 12, the concave portion 11221 is configured to be engaged with the frame 22 of the display device 2. By providing the reinforcing plate 113 here, the structural stability of the middle frame 1122 can be ensured during assembly.

Figure 9:
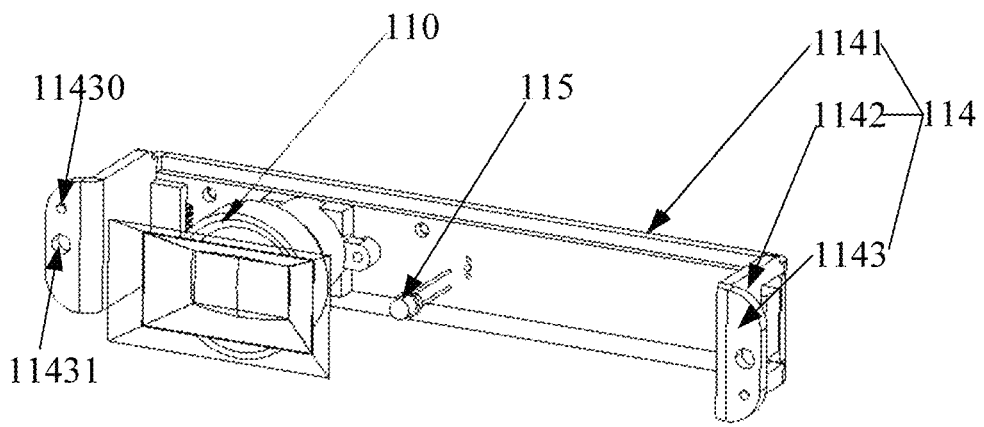
FIG. 9 shows a schematic structural diagram of a U-shaped fixing plate and the camera in the camera module after being assembled according to an embodiment of the present disclosure.
Figure 11:
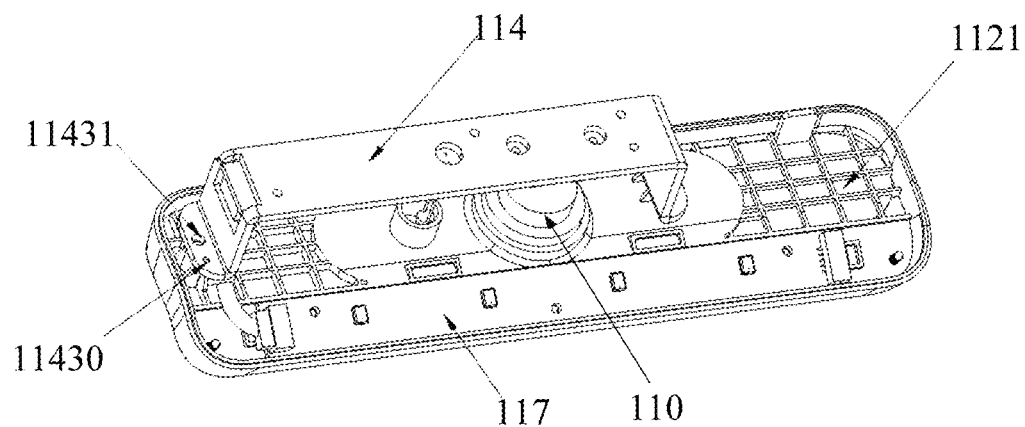
FIG. 11 shows a schematic structural diagram of the U-shaped fixing plate, the camera, the front frame and a voice module in the camera module after being assembled according to an embodiment of the present disclosure.

In embodiments of the present disclosure, with reference to FIGS. 9 to 11, the functional portion 11 may further include a U-shaped fixing plate 114 located in the accommodating cavity of the middle frame 1122. Specifically, the U-shaped fixing plate 114 may be located in the first space S1.

As shown in FIG. 9, the U-shaped fixing plate 114 may include a fixing bottom plate 1141 and two fixing side plates 1142 disposed on opposite sides of the fixing bottom plate 1141. As shown in FIGS. 10 and 11, for example, two fixing side plates 1142 may be fixed on the front frame 1121 by fasteners such as screws, bolts, etc., so that the U-shaped fixing plate 114 is connected with the front frame 1121 and forms an accommodating space with the inner side of the front frame 1121 for accommodating the camera 110. The camera 110 is fixed on the fixing bottom plate 1141.

According to some embodiments, as shown in FIG. 9 to FIG. 11, an eversion portion 1143 is formed at one end of each fixing side plate 1142 away from the fixing bottom plate 1141. A positioning hole 11430 is provided on the eversion portion 1143. The front frame 1121 is provided with a positioning pillar (not shown in the figures) which matches the positioning hole 11430. Embodiments of the present disclosure can position the assembly of the U-shaped fixing plate 114 and the front frame 1121 by cooperation between the positioning hole 11430 of the eversion portion 1143 and the positioning pillar on the front frame 1121, i.e., playing a role of positioning the assembly of the camera 110 and the front frame 1121 on the U-shaped fixing plate 114.

As shown in FIG. 9, the eversion portion 1143 of each fixing side plate 1142 is provided with the positioning hole 11430, and the positioning holes 11430 of the eversion portions 1143 on the two fixing side plates 1142 are arranged in a staggered way, so that the positioning accuracy can be improved.

In addition, as shown in FIG. 9 and FIG. 11, the eversion portion 1143 may also be provided with a first bolt hole 11431, and the front frame 102 is provided with a second bolt hole (not shown in the figures), and the second bolt hole cooperates with the first bolt hole 11431 to enable a locking bolt to pass through to fasten the U-shaped fixing plate 114 with the front frame 102.

In some embodiments of the present disclosure, as shown in FIG. 9, the functional portion 11 further includes an indicator light 115 that keeps on when the camera 110 is in a working state. When the camera 110 is started, the indicator light 115 is turned on; when the camera 110 is in the working state, the indicator light 115 remains on; when the camera 110 is turned off, the indicator light 115 is off. The setting of the indicator light 115 can intuitively remind the user regarding whether the camera 110 is in a working state.

For example, the indicator light 115 may be a light emitting diode, but embodiments of the present disclosure are not limited to this.

In some embodiments of the present disclosure, as shown in FIG. 10, the front frame 1121 is provided with a cylindrical fixing hole 11211 for fixing the indicator light 115 to improve the stability of the indicator light 115. Specifically, the indicator light 115 can be embedded in the cylindrical fixing hole 11211, the light from the indicator light 115 can be emitted in a direction close to the front frame 1121, so as to avoid affecting the camera 110.

Exemplarily, in some embodiments, the U-shaped fixing plate 114 is a heat-dissipating aluminum plate, that is, the U-shaped fixing plate 114 can be made of an aluminum plate.

The U-shaped fixing plate 114 plays the role of fixing the camera 110, and also the U-shaped fixing plate 114 is made of aluminum plate as a whole, and can thus play a role of heat dissipation.

Further, in some embodiments of the present disclosure, the area of the fixing bottom plate 1141 may be larger than the area of the orthographic projection of the camera 110 on the fixing bottom plate 1141, which can ensure that a large enough accommodating space is formed to accommodate the camera 110. Also, this design can also increase the heat dissipation area of the U-shaped fixing plate 114 to quickly export the heat generated by the camera 110 to other areas of the U-shaped fixing plate 114, thereby avoiding heat concentration and ensuring stable performance of the camera 110.

In some embodiments of the present disclosure, a heat dissipation fin (not shown in the figures) may also be provided on a side of the fixing bottom plate 1141 away from the front frame 102 to further enhance the heat dissipation effect.

In addition, in some implementations of this embodiment, in order to improve the heat dissipation effect, a plurality of heat dissipation through holes may be provided on the rear cover 1123 to enhance the heat dissipation effect. However, it should be understood that in some other embodiments, the rear cover 1123 may not be provided with heat dissipation through holes, and whether to provide the heat dissipation through holes depends on specific situations.

In an embodiment of the present disclosure, as shown in FIG. 10, the camera hole 11210 of the front frame 1121 may include a first hole section 11210*a* and a second hole section 11210*b* located on a side of the first hole section 11210*a* close to the fixing bottom plate 1141. The first hole section 11210*a* and the second hole section 11210*b* are coaxial, and the first hole section 11210*a* and the second hole section 11210*b* are integrally formed. Along a direction from the first hole section 11210*a* to the second hole section 11210*b*, the aperture of the first hole section 11210*a* gradually decreases, that is, the first hole section 11210*a* can be formed as a trumpet shape. Along the direction from the first hole section 11210*a* to the second hole section 11210*b*, the aperture of the second hole section 11210*b* is unchanged and equal to the minimum aperture of the first hole section 11210*a*, that is, the second hole section 11210*b* may be formed as a columnar shape.

It should be noted that the axes of the first hole section 11210*a* and the second hole section 11210*b* may be perpendicular to the fixing bottom plate 1141.

In embodiments of the present disclosure, the setting of the second hole section 11210*b* of the camera hole 11210 has a limiting effect on the assembly of the camera 110, that is, a part of the camera 110 can be embedded in the second hole section 11210*b*. By such design, the center of the camera 110 is aligned with the center of the cylindrical second hole section 11210*b*, so as to reduce assembly deviation.

In embodiments of the present disclosure, the setting of the first hole section 11210*b* of the camera hole 11210 determines the viewing angle of the camera 110. An obtuse angle between a side wall of the trumpet-shaped first hole section 11210 and a plane where the front frame 1121 is located is may be 110 degrees to 130 degrees, such as, 110 degrees, 120 degrees, 130 degrees, etc., embodiments of the present disclosure are not limited to this, as long as the camera 110 can be guaranteed to have a good shooting angle.

In embodiments of the present disclosure, as shown in FIG. 3 and FIG. 7, the outer side of the front frame 1121 may be provided with a transparent protective layer 116. The transparent protective layer 116 covers the camera hole 11210. The arrangement of the transparent protective layer 116 may protect optical lens and the like in the camera 110.

In addition, the transparent protective layer 116 can also cover the indicator light 115, that is, the transparent protective layer 116 can also protect the indicator light 115 while protecting the camera 110.

For example, the transparent protective layer 116 can be a plate-like structure made of PC or acrylic, but embodiments of the present disclosure are not limited to this.

In an embodiment of the present disclosure, the functional portion 11 may further include a voice module 117 located in the accommodating cavity. The voice module 117 may be electrically connected to the first adapter plate 111. Specifically, as shown in FIG. 7, the voice module 117 may be located in the first space S1. The voice module 117 may be connected to the first adapter plate 111 through a plurality of signal lines L, as shown in FIG. 6. The signal lines L for connecting the voice module 117 and the first adapter plate 111 can pass through the wire through hole on an edge of the reinforcing plate 113 so as to be connected with the voice module 117 in the first space S1 and the first adapter plate 111 in the second space S2.

It should be noted that, the aforementioned wire through hole formed at the edge of the reinforcing plate 113 is not limited to one, and multiple wire through holes may be provided and located on both sides of the reinforcing plate 113 in the length direction thereof.

The voice module 117 includes a circuit board 1171, a voice component (not shown in the figures) and a plurality of foams 1172. The voice component is installed on the inner side of the front frame 1121 through the circuit board 1171 (that is, a side of the front frame 1121 close to the back cover 1123). For example, the voice component may be embedded in the inner side of the circuit board 1171, but embodiments of the present disclosure are not limited to this, and the voice component can also be suspended on the circuit board 1171, depending on specific situations. Specifically, the circuit board 1171 may be provided with a plurality of voice holes (not shown in the figures. The foams 1172 may be protruded on the circuit board 1171, that is, the foams 1172 may be protruded on a side of the circuit board 1171 close to the front frame 1121. Each foam 1172 may surround a corresponding voice hole. The setting of the foams 1172 can play role of noise absorption and other effects to ensure sound effects.

In embodiments of the present disclosure, the setting of the voice module 117 enables the display device 2 to have a voice function. Of course, the voice component of the voice module 117 may at least include a microphone (not shown in the figures), and the voice module 117 can enable the display device 2 to have a voice communication function.

The number and arrangement of the voice holes can be determined according to actual needs. In the embodiments, the voice module 117 is integrated in the camera module 1, and the camera module 1 is arranged on the display device 2, and therefore, the voice module 117 does not need to occupy additional external space.

Figure 12:
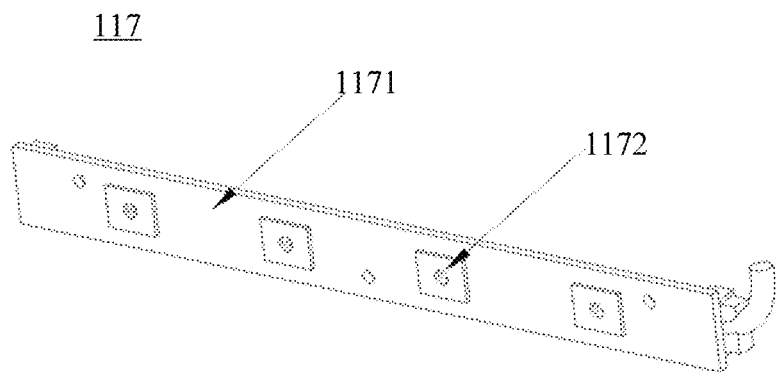
FIG. 12 shows a schematic structural diagram of the voice module in the camera module according to an embodiment of the present disclosure.

In some embodiments of the present disclosure, as shown in FIG. 12, a row of voice holes are provided on the circuit board 1171 along the extending direction of the circuit board 1171. The number of voice holes may be set to 4, and the distance between two adjacent voice holes may be 20 mm to 40 mm, for example, 20 mm, 30 mm, 40 mm, etc., but embodiments of the present disclosure are not limited to this.

Figure 13:
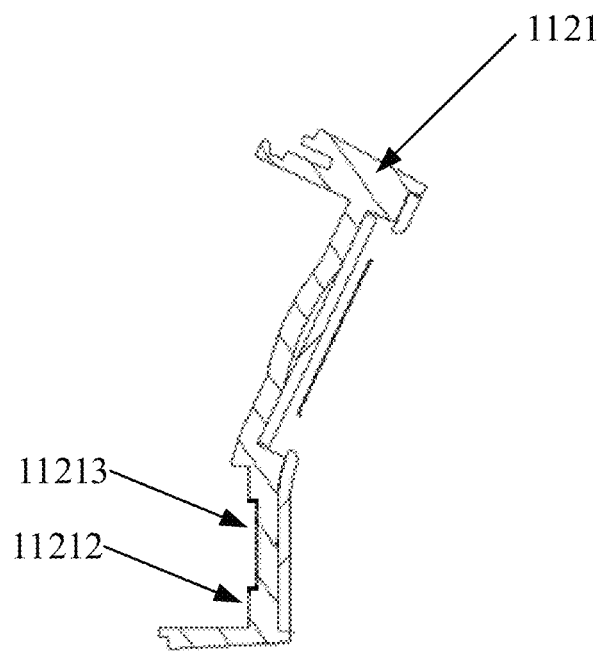
FIG. 13 shows a schematic cross-sectional view of the front frame in the camera module according to an embodiment of the present disclosure.
Figure 14:
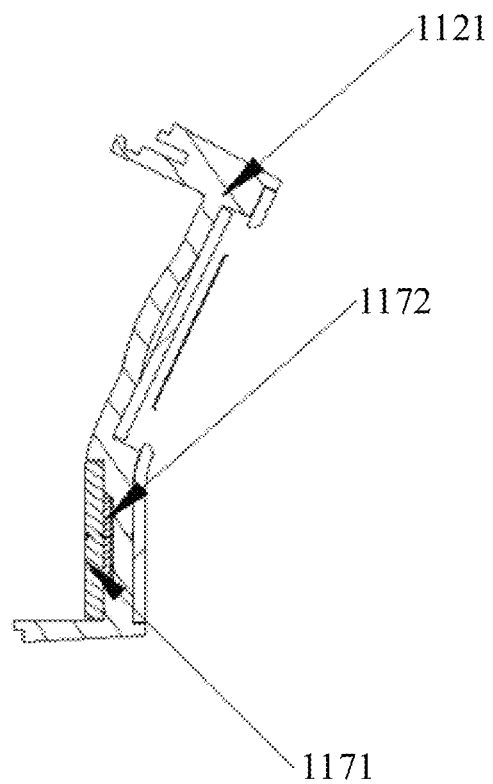
FIG. 14 shows a schematic cross-sectional view of the voice module and the front frame in the camera module after being assembled according to an embodiment of the present disclosure.

In some embodiments of the present disclosure, as shown in FIGS. 13 and 14, the inner side of the aforementioned front frame 1121 may further be formed with a mounting groove 11212 for accommodating the circuit board 1171. A groove 11213 for accommodating the foams 1172 is formed on a bottom surface of the mounting groove 11212 opposite to a groove opening of the mounting groove 11212.

The depth of the groove 11213 in the thickness direction of the front frame 1121 is smaller than the thickness of each foam 1172, so that the foam 1172 can be elastically compressed after being assembled to ensure sound effects.

Further, the difference between the thickness of each foam 1172 and the depth of the groove 11213 in the thickness direction of the front frame 1121 may be about 0.2 mm, which can ensure that the foams 1172 can be elastically compressed after being assembled, and can also avoid poor structural stability of the front frame 1121 caused by over large depth of the groove 11213.

For example, the depth of the groove 11213 in the thickness direction of the front frame 1121 may be 0.5 mm to 0.8 mm, such as 0.5 mm, 0.6 mm, 0.7 mm, 0.8 mm, etc.; and the thickness of each foam 1172 may be 0.7 mm to 1 mm, such as 0.7 mm, 0.8 mm, 0.9 mm and 1 mm, etc.

It should be noted that the setting of the above values is only an example and embodiments of the present disclosure are not limited to this, as long as the values can ensure that after the voice component is fixed on the front frame 1121 through the circuit board 1171, the foams 1172 can be pressed into the groove 11213. It should be understood that after the voice component is fixed on the front frame 1121 through the circuit board 1171, the foams 1172 undergo a certain compression deformation.

The circuit board 1171 is mounted on the front frame 1121 by bolts, but embodiments of the present disclosure are not limited to this.

Figure 15:
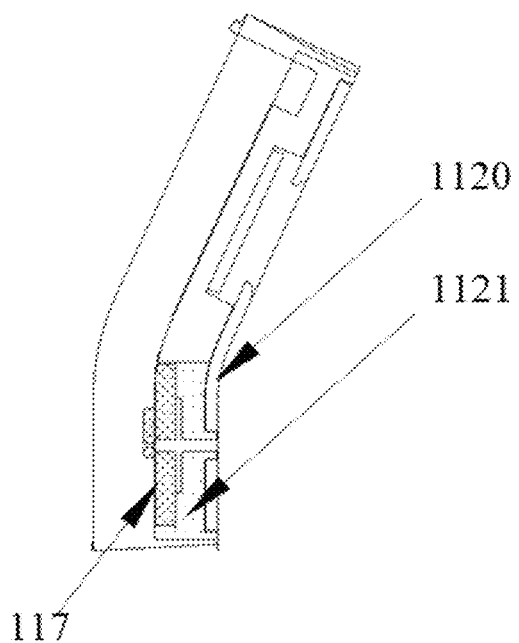
FIG. 15 shows a schematic cross-sectional view of the voice module, the front frame and a cover plate in the camera module after being assembled according to an embodiment of the present disclosure.
Figure 16:
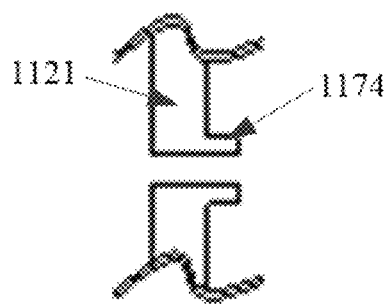
FIG. 16 shows a partial structural schematic diagram of a circuit board of the voice module in the camera module according to an embodiment of the present disclosure.

In some embodiments of the present disclosure, as shown in FIGS. 15 and 16, the front frame 1121 is provided with a first sound transmission hole 1174 corresponding to a voice hole, and the cover plate 1120 is provided with a second sound transmission hole (not shown in the figures) corresponding to the first sound transmission hole 1174. It should be noted that the orthographic projection of the first sound transmission hole 1174 on the circuit board 1171 overlaps with the voice hole; and the orthographic projection of the second sound transmission hole on the circuit board 1171 overlaps with the voice hole, and overlaps with the orthographic projection of the first sound transmission hole 1174 on the circuit board 1171. The voice module is configured to collect external sounds through the second sound transmission hole, the first sound transmission hole and the voice hole, so as to avoid being affected by the gap between the front frame 1121 and the circuit board 1171 or the gap between the front frame 1121 and the cover plate 1120 and thus ensure the accuracy of the collected sound.

As shown in FIG. 16, a side of the first sound transmission hole 1174 away from the circuit board 1171 can be protruded from the front frame 1121, and the protruding part of the first sound transmission hole 1174 can be embedded in the second sound transmission hole. In this way, while ensuring good collection effects of sound, the positioning cooperation between the front frame 1121 and the cover plate 1120 can also be achieved.

In embodiments of the present disclosure, the outer side of the front frame 1121 may be provided with a slide rail. As can be seen from FIGS. 3, 7, and 17 to 23, the slide rail may be provided with a slide cover 118 which slidably matches the slide rail. An adjustment protrusion 1180 is formed on a side of the slide cover 118 away from the front frame 1121. The adjustment protrusion 1180 may be located a the through hole 11200 of the cover plate 1120 to facilitate a user to move the adjustment protrusion 1180. It should be noted that a surface of the adjustment protrusion 1180 away from the front frame 1121 may be flush with a surface of the cover plate 1120 away from the front frame 1121, to ensure the appearance quality. However, the present disclosure is not limited to this, and the surface of the adjustment protrusion 1180 away from the front frame 1121 may be protruded from the surface of the cover plate 1120 away from the front frame 1121 and so on, depending on actual situations.

Figure 17:
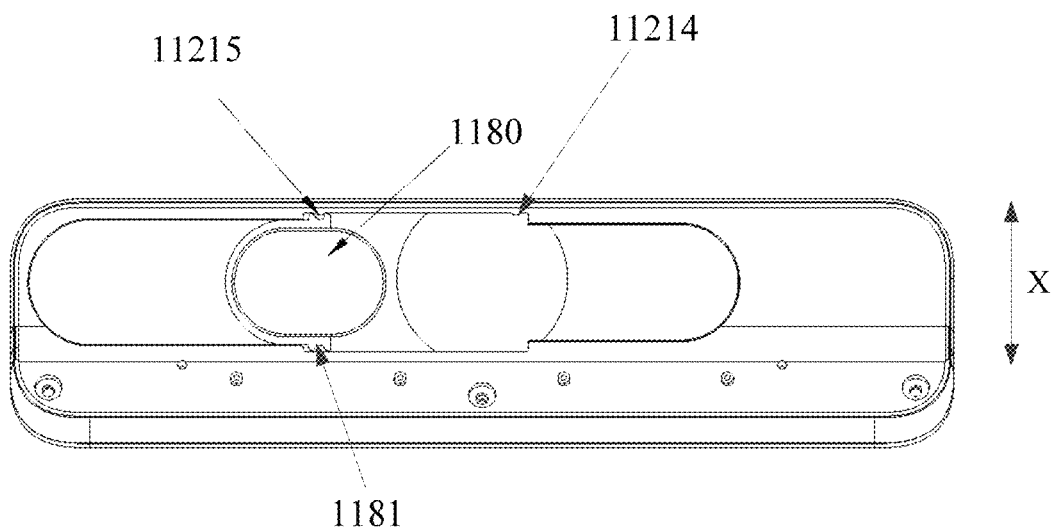
FIG. 17 shows a schematic structural diagram of a slide cover when the slide cover is in a second state according to an embodiment of the present disclosure.

The adjustment protrusion 1180 is configured to drive the slide cover 118 to move along the extending direction of the slide rail to block the through hole 11200 (i.e. block the camera hole 11210) in the first state (the state shown in FIG. 18) or open the through hole 11200 (i.e., open the camera hole 11210) in the second state (the state shown in FIG. 17).

For example, the color of the adjustment protrusion 1180 in the embodiment of the present disclosure is different from the color of other parts on the slide cover 118. For example, the color of the adjustment protrusion 1180 may be silver, and other parts may be black, etc., so that the state of the slide cover 118 can be easily and quickly recognized. However, the present disclosure is not limited to this, and a partial area of other parts of the slide cover 118 except the adjustment protrusion 1180 may be different from the color of the adjustment protrusion 1180, as long as it is convenient to quickly recognize the state of the slide cover 118.

It should be noted that the orthographic projection of the indicator light 115 on the cover plate 1120 may be located in the through hole 11200. That is, when the slide cover 118 slides to open the through hole 11200, both the camera 110 and the indicator light 115 are exposed.

In embodiments of the present disclosure, the slide cover 118 can protect the camera 110 when the camera function is not used. The area of the through hole 11200 may be larger than the area of the orthographic projection of the camera 110 on the cover plate 1120. That is, the orthographic projection of the camera 110 on the cover plate 1120 is located in the through hole 11200. But, in the second state, the orthographic projection of the camera 110 on the cover plate 1120 may be located on one side of the adjustment protrusion 1180. Therefore, it is necessary to reserve a space for the adjustment protrusion 1180 to slide. By moving the adjustment protrusion 1180, the slide cover 118 can be driven to move along the slide rail to block the camera hole 11210 to shield the camera 110 or open the camera hole 11210 to expose the camera 110.

It should be noted that the aforementioned transparent protective layer 116 can be located on a side of the slide cover 118 close to the front frame 1121. The transparent protective layer 116 prevents the slide cover 118 from damaging the camera 110 and the indicator light 115 during the sliding, prolonging the service life of the camera module 1.

In some implementations, the area of the transparent protective layer 116 may be greater than or equal to the area of the through hole 11200. That is, the orthographic projection of the transparent protective layer 116 on the cover plate 1120 can completely cover the through hole 11200, to effective protect the camera 110 and the indicator light 115 from being damaged.

Figure 18:
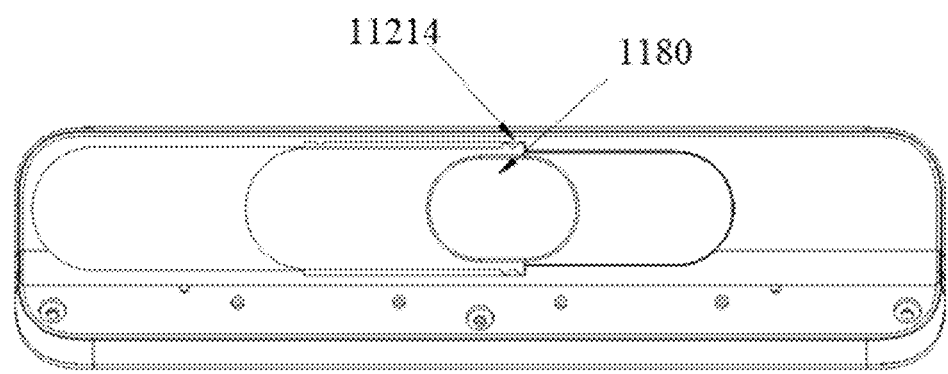
FIG. 18 shows a schematic structural diagram of the slide cover when the slide cover is in a first state according to an embodiment of the present disclosure.

In embodiments of the present disclosure, as shown in FIG. 17 and FIG. 18, a first limit protrusion and a second limit protrusion are arranged at intervals in the extending direction of the slide rail in at least one of two opposite inner side walls of the slide rail in a first direction X. The first limit structure enables the slide cover 118 to remain in the first state when it moves to be in the first state, and the second limit structure enables the slide cover 118 to remain in the second state when it moves to be in the second state, so as to prevent the slide cover 118 from slide back and forth and affecting the use of the camera.

It should be noted that the first direction X is perpendicular to the extending direction of the slide rail and the axial direction of the camera hole 11210.

In embodiments of the present disclosure, the specific structural forms of the first limit structure and the second limit structure may be the same or different. The first limit structure and the second limit structure may have various specific structural forms. For example, in some implementations, the first limit structure and the second limit structure are the same, as shown in FIGS. 17, 18, and 21 to 23. The first limit structure may include a first limit protrusion 11214, and the second limit structure may include a second limit protrusion 11215. For example, the protruding surfaces of the first limit protrusion 11214 and the second limit protrusion 11215 may be arc surfaces, but embodiments of the present disclosure are not limited to this, and the protruding surfaces of the first limit protrusion 11214 and the second limit protrusion 11215 may triangular, or trapezoidal, etc. As shown in FIG. 17 to FIG. 20, the slide cover 118 is provided with a groove 1181, and the groove 1181 is configured to be engaged with the first limit protrusion 11214, so that the slide cover 118 is limited and kept in the first state; the groove 1181 is configured to be engaged with the second limit protrusion 11215, so that the slide cover 118 is limited and kept in the second state. In this way, the slide cover 118 is prevented from sliding back and forth which may affect the use of the camera.

It should be noted that the first limit protrusion 11214 and the second limit protrusion 11215 respectively cooperate with the groove 1181 of the slide cover 118. Engagement and separation between the first limit protrusion 11214 and the second limit protrusion 11214 and the groove 181 of the slide cover 118 may be realized only by sliding the slide cover 118, and the operation is easy. It should be understood that the maximum height each of the first limit protrusion 11214 and the second limit protrusion 11215 (i.e., the maximum size in the first direction X) cannot be too large, and the slopes of the first limit protrusion 11214 and the second limit protrusion 11215 are relatively gentle, so as to facilitate the engagement and separation between the groove of the slide cover 118 and the first limit protrusion 11214 and the second limit protrusion 11215.

Figure 19:
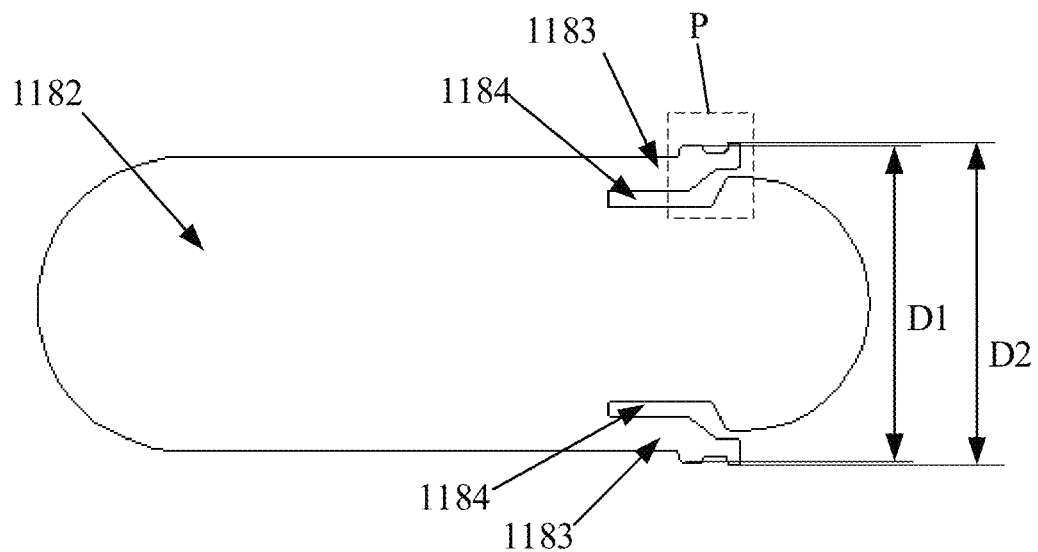
FIG. 19 shows a schematic structural diagram of a slide cover according to an embodiment of the present disclosure.

In some embodiments of the present disclosure, as shown in FIG. 19, the slide cover 118 may have a main body portion 1182 and a cantilever portion 1183, and a cut 1184 is formed between the main body portion 1182 and the cantilever portion 1183. A fixed end surface of the cantilever portion 1183 is connected to the main body portion 1182, that is, the portion at the fixed end surface of the cantilever portion 1183 may be a fulcrum of the cantilever portion 1183.

For example, the main body portion 1182 and the cantilever portion 1183 can be of a one-piece structure. In other words, a cut 1182 may be formed on the slide cover 118 to divide the slide cover 118 into the main body portion 1182 and the cantilever portion 1183. It should be noted that the aforementioned adjustment protrusion 1180 may be disposed on a side of the main body portion 1182 away from the rear cover 1123.

Figure 20:
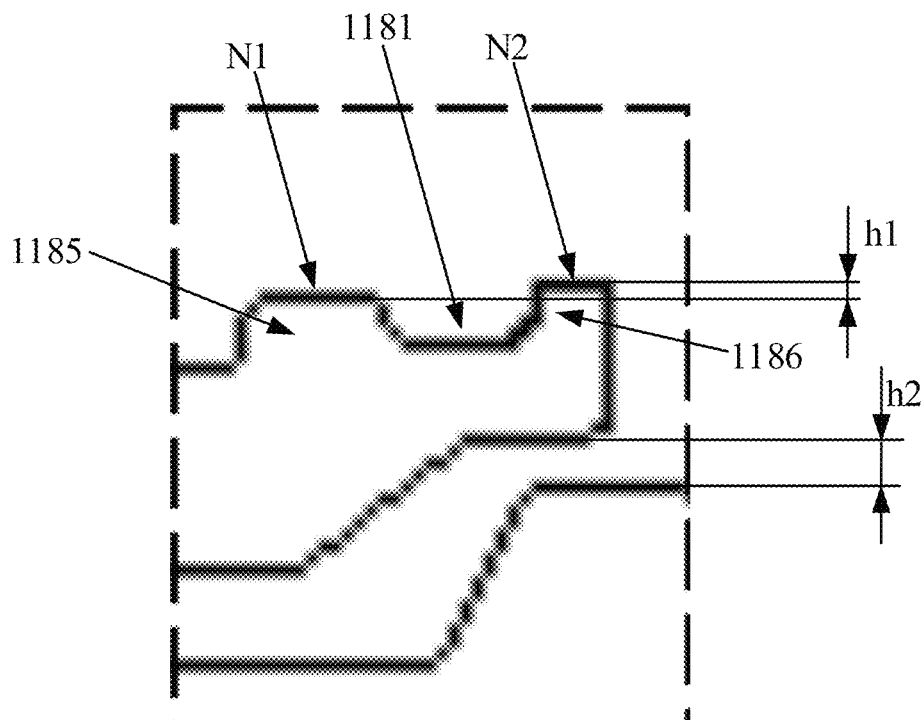
FIG. 20 shows an enlarged schematic structural diagram of P part of the slide cover shown in FIG. 9.

In embodiments of the present disclosure, as shown in FIG. 20, a first protrusion 1185 and a second protrusion 1186 arranged at a side of the first protrusion 1185 away from the fixed end of the cantilever portion 1183 are formed on a side of the cantilever portion 1183 away from the main body portion 1182. The first protrusion 1185 and the second protrusion 1186 are arranged at an interval to form the groove 1181.

In embodiments of the present disclosure, the groove 1181 is located on the cantilever portion 1183 by forming the cut 1182 on the slide cover 118, that is, the groove 1181 can be a cantilever beam groove. Thus, when the first protrusion 1185 and the second projection 1186 around the groove 1181 encounters the first limit protrusion 11214 and the second limit protrusion 11215 on the front frame 1121, the cantilever portion 1183 moves toward the main body portion 1182, that is, bringing the groove 1181 to move toward the main body portion 1182, to avoid the first limit protrusion 11214 and the second limit protrusion 11215, thereby reducing the wear of the first limit protrusion 11214 and the second limit protrusion 11215. Accordingly, service life of the slide cover 118 and the front frame 1121 can be prolonged, and the slide smoothness of the slide cover 118 is improved.

Figure 23:
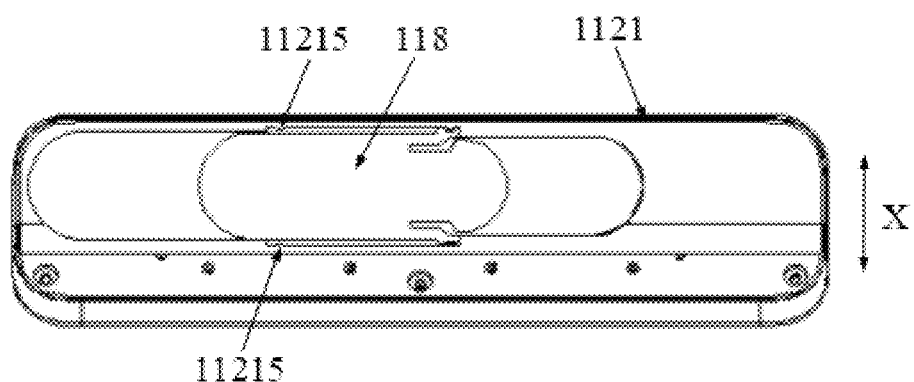
FIG. 23 shows a schematic structural diagram of the slide cover when the slide cover is in the first state according to another embodiment of the present disclosure.

It should be noted that when the slide cover 118 is in the second state (i.e., the state of opening the camera hole 11210), the second limit protrusion 11215 is snapped in the groove 1181, as shown in FIG. 19, FIG. 20, FIG. 21 and FIG. 22. When it is needed to make the slide cover 118 to be in the first state (i.e.: the state of closing the camera hole 11210), the slide cover 118 is pushed to the right to move the groove 1181 (i.e., to make the groove separate from the second limit protrusion 11215), and then the slide cover 118 is pushed to the right continuedly; when encountering the first limit protrusion 11214, the slide cover 118 is pushed to the right continuedly, so that the first limit protrusion 11214 is snapped in the groove 1181, and at this time, the slide cover 118 is in the first state, as shown in FIG. 23.

As shown in FIG. 20, a surface of the first protrusion 1185 away from the main body portion 1182 is a first convex surface N1, and a surface of the second protrusion 1186 away from the main body portion 1182 is a second convex surface N2. Since the second protrusion 1186 is closer to the fixed end surface of the cantilever portion 1183 as compared with the first protrusion 1185, in order to ensure the same feel of the slide cover 1118 during the slide process, the first convex surface N1 is closer to the main body portion 1182 than the second convex surface N2. The engaging amount of the first convex surface N1 with the first limit protrusion 11214 and the second limit protrusion 11215 is smaller than the engaging amount of the second convex surface N2 with the first limit protrusion 11214 and the second limit protrusion 11215.

During the process of switching the slide cover 118 from the second state to the first state, the first convex surface N1 first interferes with the second limit protrusion 11215, and then the second convex surface N2 interferes with the first limit protrusion 11214. During the process of switching the slide cover 118 from the first state to the second state, the second convex surface N2 first interferes with the first limit protrusion 11214, and then the first convex surface N1 interferes with the second limit protrusion 11215.

After many tests, as shown in FIG. 20, the height difference h1 between the first convex surface N1 and the second convex surface N2 may be 0.1 mm to 0.2 mm, such as 0.1 mm, 0.15 mm, 0.2 mm, etc., but embodiments of the present disclosure are not limited to this.

It should be understood that a distance between a free end surface (i.e., an end surface of the cantilever portion 1183 opposite to the fixed end surface of the cantilever portion 1183 in the length direction of the cantilever portion 1183) of the cantilever portion and the main body portion 1182 is greater than an amount of engagement between the groove 1181 and the first limit protrusion 11214 and the groove 1181 and the second limit protrusion 11215. That is, the amount of engagement between the groove 1181 and the first limit protrusion 11214 and the groove 118 land the second limit protrusion 11215 is smaller than the maximum movement amount of the cantilever portion 1183. In this way, smooth engagement and separation between the groove of the slide cover 118 and the first limit protrusion 11214 and the second limit protrusion 11215 can be ensured.

For example, a distance h2 between the free end surface of the cantilever portion 1183 and the main body portion 1182 may be 0.5 mm to 1 mm. Further, the distance between the free end surface of the cantilever portion 1183 and the main body portion 1182 may be 0.7 mm to 0.8 mm. That is, the maximum movement amount of the cantilever portion 1183 may be 0.7 mm to 0.8 mm, such as 0.7 mm, 0.72 mm, 074 mm, 0.76 mm, 0.78 mm, 0.8 mm, etc., but embodiments of the present disclosure are not limited to this.

Figure 21:
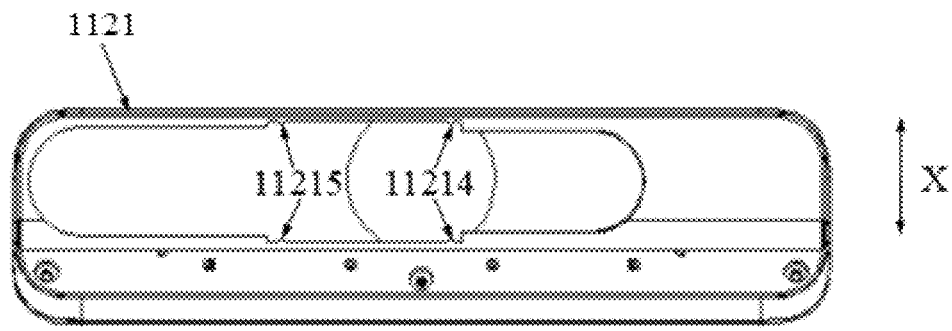
FIG. 21 shows a schematic structural diagram of the front frame in the camera module according to an embodiment of the present disclosure.
Figure 22:
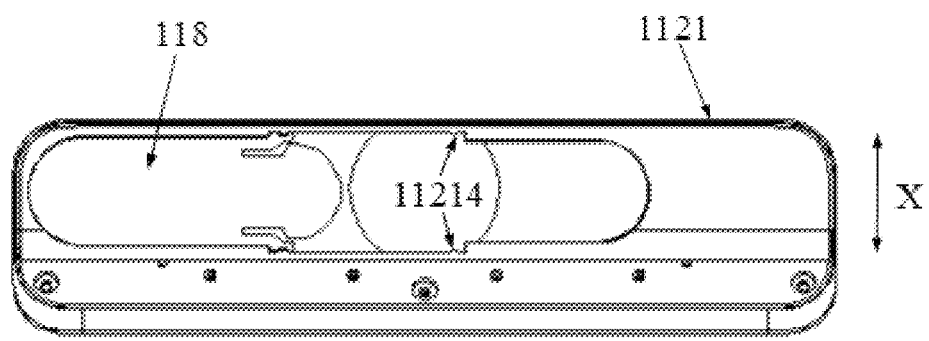
FIG. 22 shows a schematic structural diagram of the slide cover when the slide cover is in the second state according to another embodiment of the present disclosure.

In embodiments of the present disclosure, as shown in FIG. 21, the first limit protrusion 11214 and the second limit protrusion 11215 are arranged at intervals in the extending direction of the slide rail in both of the two opposite inner side walls of the slide rail in the first direction X. When the slide cover 118 is assembled on the slide rail, it can also be understood that the slide cover 118 is provided with grooves 1181 on two opposite sides in the first direction X. That is, the cantilever portions 1183 are provided on two opposite sides of the main body portion 1181, and each cantilever portion 1183 is provided with a first protrusion 1185 and a second protrusion 1186 for forming a groove 1181, as shown in FIGS. 19 and 20.

After many tests, as shown in FIG. 19, the distance D1 between the first convex surfaces N1 of the first protrusions 1185 on the two cantilever portions 1183 may be 24.8 mm to 25 mm, for example, 24.8 mm, 24.9 mm, 25 mm, etc., but embodiments of the present disclosure are not limited to this. The distance D2 between the second convex surfaces N2 of the second protrusions 1186 on the two cantilever portions 1183 may be 25.1 mm to 25.3 mm, for example, 25.1 mm, 25.2 mm, 25.3 mm, etc., but embodiments of the present disclosure are not limited to this.

It should be noted that, in some other embodiments of the present disclosure, the cut 1184 may not be provided on the slide cover 118, as shown in FIG. 17 and FIG. 18.

In general, when conducting a video conference through a display device, the participants are located in the front and bottom of the display device, and the viewing angle of the camera is limited. Therefore, in order to obtain a better video effect, in some embodiments of the present disclosure, it is necessary to make the camera 110's viewing angle range tilted downward by a preset angle (refer to the angle α in FIG. 7), and the preset angle α can be set according to actual needs.

Based on the aforementioned requirements of the capturing viewing angle of the camera 110, in some embodiments of the present disclosure, the front frame 1121 may be designed. Specifically, as shown in FIGS. 13 and 14, the front frame 1121 has a camera mounting area and a voice mounting area arranged at a side of the camera mounting area close to the mounting base 12. The camera mounting area is used for mounting the camera 110, and the camera mounting area is provided with the camera hole 11210 and so on. The voice mounting area is used to mount the voice module 117, and the mounting groove 11212 and the groove 11213 and so on may be mounted in the voice mounting area. In some embodiments of the present disclosure, a side of the camera mounting area away from the voice mounting area is inclined toward a direction away from the rear cover 1123. That is, the camera mounting area is bent in a direction close to the mounting base 12 so that the camera mounting area is arranged in a curved surface as a whole, and the angle of inclination of the camera mounting area may be the aforementioned preset angle α.

In some embodiments of the present disclosure, the preset angle α may be between 10 degrees and 50 degrees. Further, the preset angle α may be between 20 degrees and 30 degrees, such as 20 degrees, 25 degrees, 30 degrees, etc. In specific implementations, the preset angle α may be 25 degrees, but embodiments of the present disclosure are not limited to this.

It should be understood that when the front frame 1121 is formed as the aforementioned curved surface, parts of the cover plate 1120 and the middle frame 1122 that match with the front frame 1121 can also be formed as a curved surface matching the front frame 1121, so as to facilitate assembly and save space.

In addition, it should also be understood that the voice module 117 is not limited to be located on the side of the camera 110 close to the mounting base 12, and may also be located at other locations, depending on specific situations.

In embodiments of the present disclosure, as shown in FIG. 24, the first adapter plate 111 is further provided with a camera port G, a microphone port E and an echo cancellation port F. The camera 110 is connected to the camera port G through a signal line L, and the microphone port E and the echo cancellation port F are respectively connected to the voice module 117 through a signal line L.

It should be noted that both the camera 110 and the voice module 117 can be provided with ports, and both ends of a signal line L may be in the form of ports. That is, two ends of a signal line L can be respectively plugged with a port on the camera 110 and the camera port G on the first adapter plate 111, and two ends of a signal line L can be respectively plugged with an port on the voice module 117 and the microphone port E on the first adapter plate 111, and two ends of a signal line L can be respectively plugged with another port on the voice module 117 and the echo cancellation port F on the first adapter plate 111.

In embodiments of the present disclosure, the three independent signals of the camera, the microphone and the echo cancellation are connected to the main board 20 through the first adapter plate 111, which not only has reliable connection, but also has a beautiful layout. Further, a pluggable design of the camera 110 and the voice module 117 is realized by the first adapter port A on the first adapter plate 111, so that it is convenient for customers to choose suitable accessories according to their own needs.

In embodiments of the present disclosure, as shown in FIG. 24, the camera port G and the echo cancellation port F are respectively located on two opposite sides of the first adapter port A in a second direction Y, and the microphone port E and the camera port G are located on the same side of the first adapter port A in the second direction Y, and the microphone port E is located on a side of the camera port G away from the first adapter port A in a third direction Z. The third direction Z and the second direction Y are perpendicular to each other. The design is convenient to optimize the design of the lead wires on the first adapter plate 111 to ensure the quality of the camera signal, the microphone signal, and the echo cancellation signal.

Figure 25:
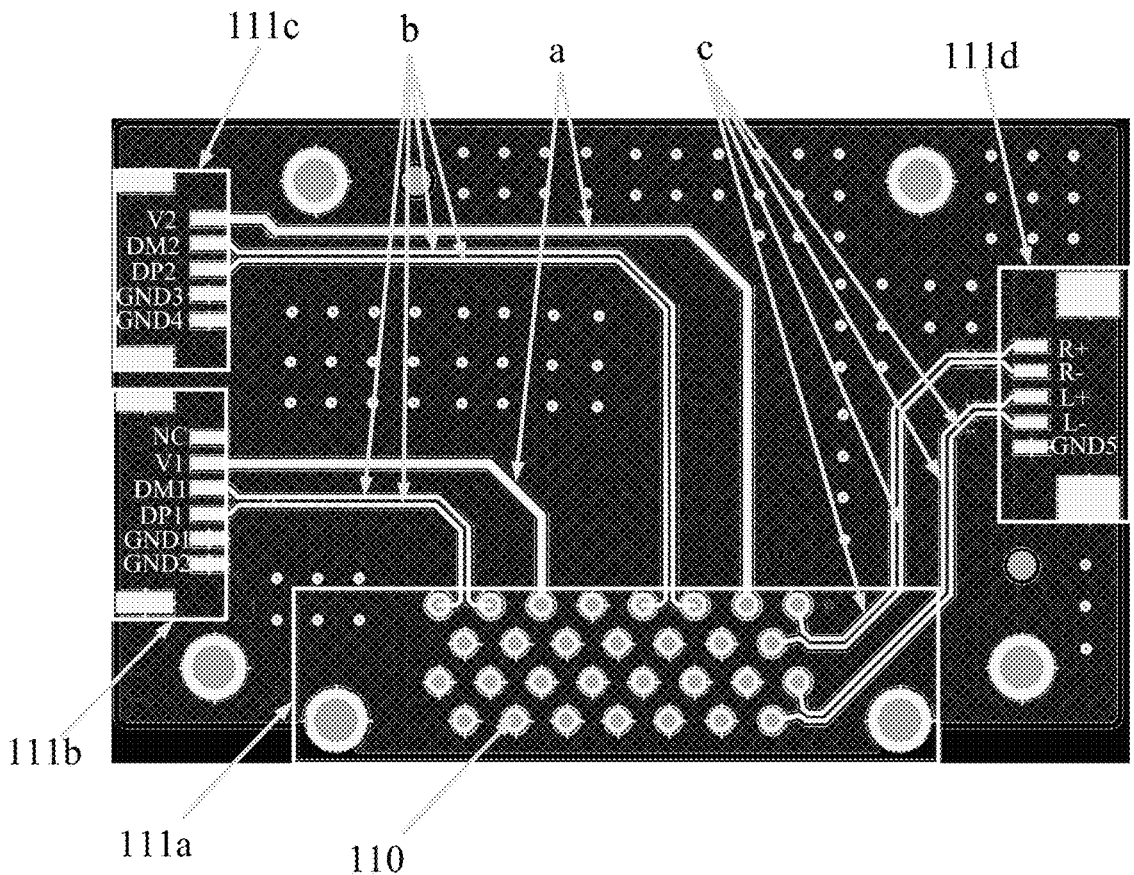
FIG. 25 shows a structural block diagram of a first adapter plate according to an embodiment of the present disclosure.

In embodiments of the present disclosure, as shown in FIG. 25, the first adapter plate 111 may include a first adapter port area 111a, a camera port area 111b, a microphone port area 111c, and an echo cancellation port area 111d.

The first adapter port A is mounted in the first adapter port area 111a. The first adapter port area 111a has a plurality of first legs 1110. The plurality of first legs 1110 at least include a first power signal leg, a first negative differential signal leg, a first positive differential signal leg, a second power signal leg, a second negative differential signal leg, a second positive differential signal leg, a right channel positive leg, a right channel negative leg, a left channel positive leg, and a left channel negative leg. It should be noted that the first adapter port A can be installed in the first adapter port area 111a by welding, and the number of legs in the first adapter port A is the same as the number of first legs 1110 in the first adapter port area 111a, and legs in the first adapter port A correspond to the first legs 1110 in the first adapter port area 111a one to one.

The camera port G is mounted in the camera port area 111b. The camera port area 111b has a first power signal pin V1, a first negative differential signal pin DM1, a first positive differential signal pin DP1, a first ground pin GND1 and a second ground pin GND2 which are arranged in sequence. The second ground pin GND2 is closer to the first adapter port area 111a than the first ground pin GND1. The first power signal pin V1 is connected to the first power signal leg via a power signal lead a on the first adapter plate 111. The first negative differential signal pin DM1 is connected to the first negative differential signal leg through a differential signal lead b on the first adapter plate 111. The first positive differential signal pin DP1 is connected to the first positive differential signal leg through a differential signal lead b on the first adapter plate 111. It should be noted that the camera port G is installed in the camera port area 111b by welding. The number of pins in the camera port G is the same as the number of pins on the camera port area 111b, and the pins in the camera port G correspond to the pins on the camera port area 111b one to one.

In embodiments of the present disclosure, the camera port area 111b may further have a fool-proofing pin NC. The fool-proofing pin NC is located on a side of the first power signal pin V1 away from the first negative differential signal pin DM1.

For example, the camera port area 111b can be provided with 6 pins, which may specifically be the aforementioned fool-proofing pin NC, the first power signal pin V1, the first negative differential signal pin DM1, the first positive differential signal pin DP1, the first ground pin GND1 and the second ground pin GND2. The distance between adjacent pins may be 1.25 mm. Therefore, a USB (Universal Serial Bus) 2.0-GH1.25-6Pin model may be correspondingly selected as the camera port G on the camera port area 111b, where GH1.25 refers to that the spacing between adjacent pins is 1.25 mm.

A microphone port E may be mounted in the microphone port area 111c. The microphone port area 111c has a second power signal pin V2, a second negative differential signal pin DM2, a second positive differential signal pin DP2, a third ground pin GND3 and a fourth ground pin GND4 which are arranged in sequence. The fourth ground pin GND4 is closer to the camera port area 111b than the third ground pin GND3. The second power signal pin V2 is connected to the second power signal leg through a power signal lead a on the first adapter plate. The second negative differential signal pin DM2 is connected to the second negative differential signal leg through a differential signal lead b on the first adapter plate 111. The second positive differential signal pin DP2 is connected to the second positive differential signal leg through a differential signal lead b on the first adapter plate 111. It should be noted that the microphone port E is installed in the microphone port area 111c by welding. The number of pins in the microphone port E is the same as the number of pins on the microphone port area 111c, and pins in the microphone port E correspond to the pins on the microphone port area 111c one to one.

For example, the microphone port area 111c can be provided with 5 pins, which may specifically be the aforementioned second power signal pin V2, the second negative differential signal pin DM2, the second positive differential signal pin DP2, the third ground pin GND3 and the fourth ground pin GND4. The distance between adjacent pins may be 1.25 mm. Therefore, a USB2.0-GH1.25-5Pin model may be correspondingly selected as the microphone port E on the microphone port area 111c.

An echo cancellation port F is mounted in the echo cancellation port area 111d. The echo cancellation port F has a right channel positive pin R+, a right channel negative pin R−, a left channel positive pin L+, a left channel negative pin L− and a fifth ground pin GND5. The fifth ground pin GND5 is closer to the first adapter port area 111a than the left channel negative pin L−. The right channel positive pin R+ is connected to the right channel positive leg through a channel signal lead c on the first adapter plate 111. The right channel negative pin R− is connected to the right channel negative leg through a channel signal lead c on the first adapter plate 111. The left channel positive pin L+ is connected to the left channel positive leg through a channel signal lead c on the first adapter plate 111. The left channel negative pin L− is connected to the left channel negative leg through a channel signal lead c on the first adapter plate 111. It should be noted that the echo cancellation port F is installed in the echo cancellation port area 111d by welding. The number of pins in the echo cancellation port F is the same as the number of pins on the echo cancellation port area 111d, and pins in the echo cancellation port F correspond to the pins on the echo cancellation port area 111d one to one.

For example, the echo cancellation port area 111d can be provided with 5 pins, which may specifically be the above-mentioned right channel positive pin R+, the right channel negative pin R−, the left channel positive pin L+, the left channel negative pin L−, and the fifth ground pin GND5. The distance between adjacent pins may be 1.25 mm. Therefore, a USB2.0-GH1.25-5Pin model may be correspondingly selected as the echo cancellation port F on the echo cancellation port area 111d.

In embodiments of the present disclosure, the line widths of the channel signal lead c and the differential signal lead b on the first adapter plate 111 are both smaller than the line width of the power signal lead a on the first adapter plate 111. By widening the power signal lead a, the load capacity of the power signal lead a can be increased. It should be noted that the line width of the channel signal lead c on the first adapter plate 111 is equal to the line width of the differential signal lead b on the first adapter plate 111, and thus the design difficulty of the leads on the first adapter plate 111 is reduced.

For example, the ratio of the line width of the power signal lead a to the line width of the differential signal lead b may be 1.5 to 2.5, such as, 1.5, 2, 2.5, etc., but embodiments of the present disclosure are not limited to this. In an embodiment of the present disclosure, the line width of the power signal lead a may be 15 mil, the line width of each of the differential signal lead b and the channel signal lead c may be 8 mil, but embodiments of the present disclosure are not limited to this, and line widths can be set depending on specific situations.

In embodiments of the present disclosure, as shown in FIG. 25, the number of the first legs 1110 in the first adapter port area 111a is greater than the sum of the number of pins in the camera port area 111b, the microphone port area 111c and the echo cancellation port area 111d, and the extra first legs 1110 can be used as reserved legs, which is convenient for addition of a camera 110 or a voice module 117 to later products. The first adapter plate can play a compatibility role and speed up the iteration of product development.

For example, the number of the first legs 1110 in the first adapter port area 111a may be 30, but embodiments of the present disclosure are not limited to this. Based on the design of the first legs 1110 in the first adapter port area 11a, a TX25-30P-LT-H1E model may be selected as the first adapter port A on the first adapter port area 111a.

Figure 26:
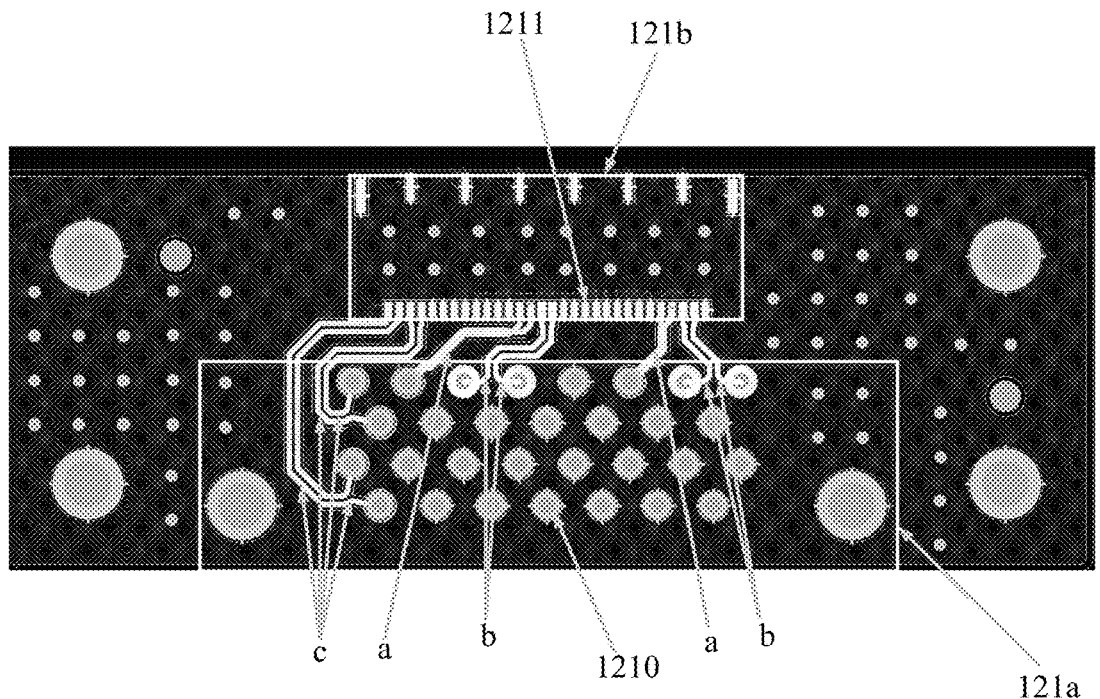
FIG. 26 shows a structural block diagram of a second adapter plate according to an embodiment of the present disclosure.

In embodiments of the present disclosure, as shown in FIG. 26, the second adapter plate 121 includes a second adapter port area 121a and a third adapter port area 121b.

A second adapter port B may be mounted in the second adapter port area 121a. The second adapter port area 121a has a plurality of second legs 1210. It should be noted that the second adapter port B may be mounted on the second adapter port area 121a by welding. The number of legs in the second adapter port B is the same as the number of the second legs 1210 in the second adapter port area 121a, and legs in the second adapter port B correspond to the second legs 1210 in the second adapter port area 121a one to one. The number of the second legs 1210 is the same as the number of the first legs 1110, and when the second port B is plugged with the first port A, the second legs 1210 are connected to the first legs 1110 in a one-to-one correspondence.

The third adapter port area 121b may be located on a side of the second adapter port area 121a, and a third adapter port C is mounted in the third adapter port area 121b. The opening direction of the third adapter port C is contrary to the opening direction of the second adapter port B. The third adapter port C is configured to be connected to the main board 20 in the display device 2. The third adapter port area 121b has a plurality of third legs 1211. The number of the third legs 1211 is the same as the number of the second legs 1210. It should be noted that the third adapter port C can be installed in the third adapter port area 121b by welding. The number of legs in the third adapter port C is the same as the third legs 1211 on the third adapter port area 121b, and legs in the third adapter port C correspond to the third legs 1211 on the third adapter port area 121b one to one.

A second leg 1210 is configured to be connected to the first power signal leg of the first adapter plate 111, and is connected to two adjacent third legs 1211 through a power signal lead a on the second adapter plate 121. A second leg 1210 is configured to be connected to the first negative differential signal leg of the first adapter plate 111, and is connected to a third leg 1211 through a differential signal lead b on the second adapter plate 121. A second leg 1210 is configured to be connected to the first positive differential signal leg of the first adapter plate 111, and is connected to a third leg 1211 through a differential signal lead b on the second adapter plate 121. A second leg 1210 is configured to be connected to the second power signal leg of the first adapter plate 111, and is connected to two adjacent third legs 1211 through a power signal lead a on the second adapter plate 121. A second pin 1210 is configured to be connected to the second negative differential signal leg of the first adapter plate 111, and is connected to a third leg 1211 through a first differential signal lead b on the second adapter plate 121. A second pin 1210 is configured to be connected to the second positive differential signal leg of the first adapter plate 111, and is connected to a third leg 1211 through a differential signal lead b on the second adapter plate 121. A second leg 1210 is configured to be connected to the right channel positive leg of the first adapter plate 111, and is connected to a third leg 1211 through a channel signal lead c on the second adapter plate 121. A second leg 1210 is configured to be connected to the right channel negative leg of the first adapter plate 111, and is connected to a third leg 1211 through a channel signal lead c on the second adapter plate 121. A second leg 1210 is configured to be connected to the left channel positive leg of the first adapter plate 111, and is connected to a third leg 1211 through a channel signal lead c on the second adapter plate 121. A second leg 1210 is configured to be connected to the left channel negative leg of the first adapter plate 111, and is connected to a third leg 1211 through a channel signal lead c on the second adapter plate 121.

Optionally, as shown in FIG. 25 and FIG. 26, the plurality of first legs 1110 on the first adapter port area 111a are divided into multiple rows of first leg groups arranged at intervals in the third direction Z. Each row first leg group includes a plurality of first legs 1110 spaced in the second direction Y. The plurality of second legs 1210 on the second adapter port area 121a are divided into multiple rows of second leg groups arranged at intervals in the third direction Z. Each row of second leg groups includes a plurality of second legs 1210 arranged at intervals in the second direction Y. The plurality of third legs 1211 on the third port area 121b are located in the same row, and are arranged at intervals in the second direction Y.

In some embodiments of the present disclosure, the aforementioned third adapter port C may be configured to be connected to the main board 20 in the display device 2 through a flexible circuit board 23 in the display device 2. Specifically, two ends of the flexible circuit board 23 are respectively provided with ports which are to be respectively plugged with the port on the main board 20 and the third adapter port C. The port on the flexible circuit board can also be provided with a plurality of legs, and the number of the legs is the same as the number of the third legs 1211 on the port area 121b, for example, both numbers are set as 30. The distance between adjacent legs may be 0.5 mm, but embodiments of the present disclosure are not limited to this.

It should be noted that the voltage applied to the aforementioned power signal lead a may be 5V, but embodiments of the present disclosure are not limited to this.

As can be seen from the above description regarding the first adapter plate 111 and the second adapter plate 112, embodiments of the present disclosure simplifies wiring and reduces wire costs by integrating camera signals, microphone signals, and echo cancellation signals on the adapter plates.

In addition, the pins and legs on the first adapter plate 111 and the second adapter plate 112 can be customized to ensure the quality of the camera signals, microphone signals, and echo cancellation signals and optimize the wiring. Also, the line length of the flexible circuit board 23 between the main board 20 and the second adapter plate 112 exceeds 1 m, and the power signal lead a on the second adapter plate 112 is processed in two-wire parallel, that is: the power signal lead a on the second adapter plate 112 can be connected to two adjacent third legs 1211 to increase the load capacity. The first adapter plate 111 and the second adapter plate 112 currently have 30 defined legs, 12 legs are actually used, and 18 legs are reserved. In this way, when microphones and cameras are to be added in later products, compatible design for the adapter plates is available and product development. iteration speed can be increased.

In embodiments of the present disclosure, the camera 110 and the voice module 117 are designed to be pluggable through an adapter plate, and customers can decide whether to select them according to their own needs to meet different market needs.

The camera 110 and the voice module 117 are connected to the first adapter plate 111 through the signal line L to form a pluggable functional portion 11. The first adapter plate 111 and the second adapter plate 112 are connected through 30Pin-connectors. The second adapter plate 112 is connected with the main board 20 through a 30Pin-flexible circuit board 23. Compared with ordinary external cameras and microphones, the embodiments of the present disclosure use the adapter plate to connect three independent signals (the camera signals, the microphone signals, and the echo cancellation signals) with the main board 20 through the adapter plat. The connection is firm, and also the layout is beautiful. Further, the camera and microphone are designed to be pluggable through the adapter plate, and customers can decide whether to choose this module according to their own needs, which is convenient for cost control. In addition, at present, high-end interactive panels generally use multi-camera and multi-microphone designs. At present, the 30 pin connector port actually uses 12 pins, and there are reserved unused pins, which can be used for later function expansion.

An embodiment of the present disclosure further provides an electronic device, which includes the display device 2 and the camera module 1 described in any of the foregoing embodiments. The mounting base 12 of the camera module 1 is fixed on the display device 2.

It should be noted that, in addition to the aforementioned main board 20, the rear shell 21, the frame 22 and the flexible circuit board 23, as shown in FIG. 24, the display device 2 of the embodiment of the present disclosure may further include a speaker 24 and a display screen 25. The speaker 24 and the display screen 25 may be connected with the main board 20. The speaker 24 may be connected with the main board 20 through the port structure, and the port structure corresponding to this speaker may be 4 pins. In addition, the number of speakers 24 may not only be set to one, and two or more speakers 24 may also be set.

It should be noted that the display screen 25 in embodiments of the present disclosure may be a liquid crystal display screen or an organic light-emitting display, depending on specific situations.

Other embodiments of the present disclosure will readily occur to those skilled in the art upon consideration of the specification and practice of the invention disclosed herein. The present disclosure is intended to cover any variations, uses, or adaptations that follow the general principles of the present disclosure and include common general knowledge or techniques in the technical field not disclosed by the present disclosure. The description and examples are to be regarded as exemplary only, the true scope and spirit of the present disclosure are defined by the appended claims.

What is claimed is:

1. A camera module, configured to be connected with a display device, the display device being provided with a main board, and the camera module comprising:
   a mounting base configured to be fixedly connected with the display device; and
   a functional portion configured to be detachably connected with the mounting base, wherein the functional portion comprises a casing, a camera and a first adapter plate which are mounted in the casing, the first adapter plate and the camera are connected, and the first adapter plate is configured to be connected to the main board in the display device when the functional portion is mounted on the mounting base;
   wherein the mounting base comprises a chassis configured to be fixedly connected with the display device and a second adapter plate connected with the chassis, and the second adapter plate is configured to be connected with the main board in the display device;
   wherein the first adapter plate is provided with a first adapter port, the second adapter plate is provided with a second adapter port, and the first adapter port is configured to be plugged with the second adapter port when the functional portion is mounted on the mounting base, so as to perform signal transmission between the camera and the main board in the display device;
   wherein the casing comprises:
   a middle frame having an accommodating cavity for accommodating the camera and the first adapter plate, wherein a front end of the accommodating cavity is open, and a bottom side of the middle frame close to the mounting base is provided with a first through hole corresponding to the first adapter port, and the first through hole communicates with the accommodating cavity; and
   a front frame arranged at the front end of the accommodating cavity, wherein the front frame is provided with a camera hole corresponding to the camera.

2. The camera module according to claim 1, wherein:
   the casing further comprises a cover plate mounted on an outer side of the front frame, and the cover plate is provided with a through hole; and
   an orthographic projection of the camera on the cover plate is located in the through hole.

3. The camera module according to claim 2, wherein the functional portion further comprises a voice module located in the accommodating cavity and electrically connected to the first adapter plate.

4. The camera module according to claim 3, wherein the voice module comprises a circuit board and a voice component mounted on the circuit board, the voice component comprises at least a microphone, the voice component is mounted on an inner side of the front frame via the circuit board, and the circuit board is provided with a voice hole.

5. The camera module according to claim 4, wherein the front frame is provided with a first sound transmission hole corresponding to the voice hole, and the cover plate is provided with a second sound transmission hole corresponding to the first sound transmission hole;
wherein the voice module is configured to collect external sound through the second sound transmission hole, the first sound transmission hole and the voice hole.

6. The camera module according to claim 4, wherein a rear end of the accommodating cavity of the middle frame is open, the casing further comprises a rear cover, and the rear cover covers the rear end of the accommodating cavity.

7. The camera module according to claim 6, wherein:
the front frame has a camera mounting area and a voice mounting area arranged at a side of the camera mounting area close to the mounting base, the camera mounting area is provided with the camera hole, and a side of the camera mounting area away from the voice mounting area is inclined toward a direction away from the rear cover.

8. The camera module according to claim 3, wherein:
the voice module further comprises foam, and the foam surrounds the voice hole correspondingly;
a mounting groove for accommodating the circuit board is formed on an inner side of the front frame, and a groove for accommodating the foam is formed on a bottom surface of the mounting groove opposite to a groove opening of the mounting groove.

9. The camera module according to claim 8, wherein a depth of the groove in a thickness direction of the front frame is smaller than a thickness of the foam.

10. The camera module according to claim 3, wherein:
the first adapter plate is further provided with a camera port, a microphone port and an echo cancellation port, the camera is connected to the camera port through a signal line, and the microphone port and the echo cancellation port are connected with the voice module through signal lines, respectively; and
the camera port and the echo cancellation port are respectively located on opposite sides of the first adapter port in the second direction, and the microphone port and the camera port are located on a same side of the first adapter port in the second direction, the microphone port is located on a side of the camera port away from the first adapter port in a third direction, and the third direction and the second direction are perpendicular to each other.

11. The camera module according to claim 10, wherein the second adapter plate is further provided with a third adapter port, and the third adapter port and the second adapter port are oppositely arranged in the second direction.

12. The camera module according to claim 11, wherein the third adapter port is configured to be connected to the main board in the display device through a flexible circuit board in the display device.

13. The camera module according to claim 2, wherein a slide rail is provided on an outer side of the front frame, and a slide cover is provided on the slide rail to slidably match the slide rail, an adjustment protrusion is provided on a side of the slide cover away from the front frame, the adjustment protrusion is located in the through hole of the cover plate, the adjustment protrusion is configured to drive the slide cover to move along an extending direction of the slide rail so as to block the camera hole in a first state or open the camera hole in a second state.

14. The camera module of claim 13, wherein:
a first limit protrusion and a second limit protrusion are arranged at intervals in the extending direction of the slide rail in at least one of two opposite inner side walls of the slide rail in a first direction, the first direction is perpendicular to the extending direction of the slide rail and an axial direction of the camera hole;
the slide cover is provided with a groove, and the groove is configured to be fit with the first limit protrusion, so that the slide cover is limited and kept in the first state; the groove is configured to be fit with the second limit protrusion, so that the slide cover is limited and kept in the second state.

15. The camera module according to claim 14, wherein the slide cover has a main body portion and a cantilever portion, a cut is formed between the main body portion and the cantilever portion, a fixed end surface of the cantilever portion is connected to the main body portion, a first protrusion and a second protrusion arranged at a side of the first protrusion away from the fixed end of the cantilever portion are formed on a side of the cantilever portion away from the main body portion, and the first protrusion and the second protrusion are arranged at an interval to form the groove of the slide cover.

16. The camera module according to claim 15, wherein a surface of the first protrusion away from the main body portion is a first convex surface, and a surface of the second protrusion away from the main body portion is a second convex surface, and the first convex surface is closer to the main body portion than the second convex surface.

17. The camera module according to claim 15, wherein a distance between a free end surface of the cantilever portion and the main body portion is greater than an amount of engagement between the groove of the slide cover and the first limit protrusion and the groove of the slide cover and the second limit protrusion.

18. The camera module according to claim 14, wherein the first limit protrusion and the second limit protrusion are arranged at intervals in the extending direction of the slide rail in both of the two opposite inner side walls of the slide rail in the first direction;
wherein grooves are provided on two opposite sides of the slide cover in the first direction.

19. The camera module according to claim 1, wherein:
when the chassis is fixedly connected with the display device, the chassis is configured to form a mounting cavity with a rear shell of the display device for accommodating the second adapter plate, and the chassis is provided with a second through hole corresponding to the second transition port;
one of the first adapter port and the second adapter port is a male connector head, and the other one of the first adapter port and the second adapter port is a female connector head, and the male connector head passes through the first through hole and the second through hole to be plugged with the female connector head.

20. The camera module according to claim 1, wherein a partial area of a bottom side of the middle frame is formed as a concave portion, the concave portion is located on a side of the first through hole close to the front frame, and the concave portion is configured to be engaged with a frame of the display device when the functional portion is mounted on the mounting base.

21. The camera module according to claim 20, wherein:
a reinforcing plate opposite to the concave portion is provided in the accommodating cavity of the middle frame;

an edge of the reinforcing plate is fixedly connected with a cavity wall of the accommodating cavity to divide the accommodating cavity into a first space close to the front frame and a second space away from the front frame, the first space is used for accommodating the camera, and the second space is used for accommodating the first adapter plate; and the reinforcing plate is provided with a wire through hole, and the wire through hole is used for a signal wire connected between the camera and the first adapter plate to pass through.

22. The camera module according to claim 1, wherein:
the functional portion further comprises a U-shaped fixing plate located in the accommodating cavity of the middle frame, the U-shaped fixing plate comprises a fixing bottom plate and two fixing side plates on opposite sides of the fixing bottom plate;

both of the fixing side plates are fixedly connected with the front frame, so that the U-shaped fixing plate is connected with the front frame and forms an accommodating space with an inner side of the front frame for accommodating the camera; and the camera is fixedly connected with the fixing bottom plate.

23. The camera module according to claim 22, wherein the camera hole of the front frame comprises a first hole section and a second hole section located on a side of the first hole section close to the fixing bottom plate, and the first hole section is coaxial with the second hole section;

wherein, along a direction from the first hole section to the second hole section, an aperture of the first hole section gradually decreases, and an aperture of the second hole section remains unchanged and is the same as a minimum aperture of the first hole section.

24. An electronic device, comprising a display device and a camera module, wherein the camera module is configured to be connected with the display device, the display device is provided with a main board, and the camera module comprises:

a mounting base configured to be fixedly connected with the display device; and a functional portion configured to be detachably connected with the mounting base, wherein the functional portion comprises a casing, a camera and a first adapter plate which are mounted in the casing, the first adapter plate and the camera are connected, and the first adapter plate is configured to be connected to the main board in the display device when the functional portion is mounted on the mounting base;

wherein the mounting base comprises a chassis configured to be fixedly connected with the display device and a second adapter plate connected with the chassis, and the second adapter plate is configured to be connected with the main board in the display device;

wherein the first adapter plate is provided with a first adapter port, the second adapter plate is provided with a second adapter port, and the first adapter port is configured to be plugged with the second adapter port when the functional portion is mounted on the mounting base, so as to perform signal transmission between the camera and the main board in the display device;

wherein the casing comprises:

a middle frame having an accommodating cavity for accommodating the camera and the first adapter plate, wherein a front end of the accommodating cavity is open, and a bottom side of the middle frame close to the mounting base is provided with a first through hole corresponding to the first adapter port, and the first through hole communicates with the accommodating cavity; and a front frame arranged at the front end of the accommodating cavity, wherein the front frame is provided with a camera hole corresponding to the camera.

* * * * *